(12) United States Patent
Taniguchi

(10) Patent No.: US 6,456,587 B2
(45) Date of Patent: *Sep. 24, 2002

(54) RING TRANSMISSION SYSTEM AND SQUELCH METHOD USED FOR SAME

(75) Inventor: Atsuki Taniguchi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/478,096

(22) Filed: Jan. 5, 2000

Related U.S. Application Data

(63) Continuation of application No. 08/712,141, filed on Sep. 11, 1996, now Pat. No. 6,122,250.

(30) Foreign Application Priority Data

Sep. 26, 1995 (JP) ............................................. 7-247275

(51) Int. Cl.⁷ ............................................. G01R 31/08
(52) U.S. Cl. ....................................... 370/216; 370/223
(58) Field of Search ................................. 370/216, 221, 370/222, 223, 224, 242, 241, 248; 714/100, 1, 2

(56) References Cited

U.S. PATENT DOCUMENTS

| | | | |
|---|---|---|---|
| 5,278,824 A | | 1/1994 | Kremer |
| 5,341,364 A | * | 8/1994 | Narra et al. ................. 370/223 |
| 5,394,389 A | * | 2/1995 | Kremer ....................... 370/223 |
| 5,408,610 A | | 4/1995 | Arakawa |
| 5,412,652 A | * | 5/1995 | Lu .............................. 370/223 |
| 5,440,540 A | * | 8/1995 | Kremer ....................... 370/223 |
| 5,442,620 A | | 8/1995 | Kremer |
| 5,537,393 A | * | 7/1996 | Shioda et al. ................ 370/223 |
| 5,566,178 A | | 10/1996 | Butter et al. |
| 5,793,745 A | * | 8/1998 | Manchester .................. 370/224 |
| 5,815,489 A | * | 9/1998 | Takatori et al. .............. 370/217 |

FOREIGN PATENT DOCUMENTS

| | | |
|---|---|---|
| JP | 6-37779 | 2/1994 |
| JP | 6-37781 | 2/1994 |
| JP | 6-205028 | 7/1994 |
| JP | 06216922 A | 8/1994 |
| JP | 07131474 A | 5/1995 |
| JP | 7-202924 | 8/1995 |
| JP | 7-212382 | 8/1995 |
| JP | 8-214020 | 8/1996 |
| JP | 08316978 A | 11/1996 |
| JP | 08316979 A | 11/1996 |
| JP | 09051332 A | 2/1997 |

* cited by examiner

Primary Examiner—Ajit Patel
(74) Attorney, Agent, or Firm—Katten Muchin Zavis Rosenman

(57) ABSTRACT

A ring transmission system of a bidirectional line switched ring (BLSR) type comprising nodes (A) to (F) connected by ring transmission lines RL, wherein the nodes (A) to (F) have modified squelch tables [A] to [F] and squelch decision units. The ring topology is built by transmitting a ring topology frame and inserting the ID of each node in that frame. Each of the nodes creates a modified squelch table comprised of modified node IDs given to the nodes in a rising order of connection starting from itself using itself as "0" or another reference value. Whether or not to perform a squelch operation is determined by comparing the magnitude of the modified node IDs of the nodes which signals cannot reach at the time of occurrence of a failure and the modified node IDs in the modified squelch table. This enables the squelch processing to be performed at a high speed.

4 Claims, 35 Drawing Sheets

[ TURN AROUND OF FRAME ENDS WHEN FRAME HAVING HOME NODE ID AT ITS HEAD RETURNS ]

Fig.5

| PW | AW | SV | MP | HS | HR(1) | HM(1) | HT(1) | HR(2) | HM(2) | HT(2) |
|---|---|---|---|---|---|---|---|---|---|---|
| | | | | | (FROM EAST) | (WORK) | (TO WEST) | (FROM WEST) | (PTCT) | (TO EAST) |

Fig.8A
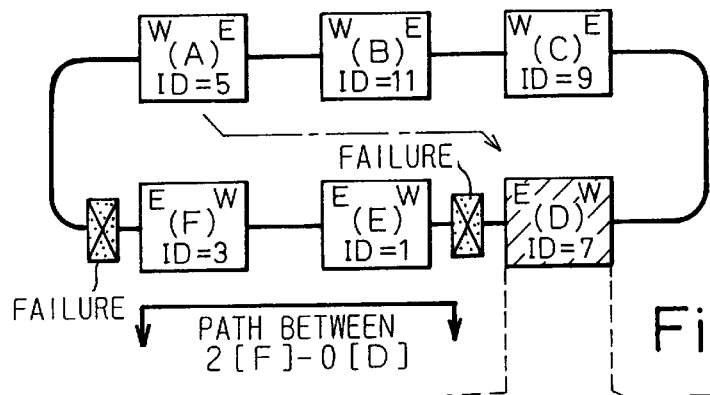
Fig.8B
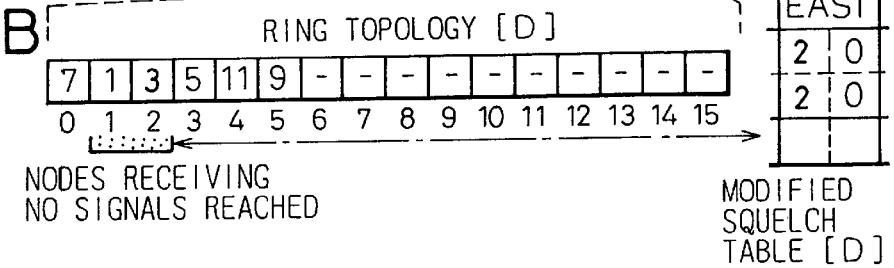
Fig.8C
Fig.8D
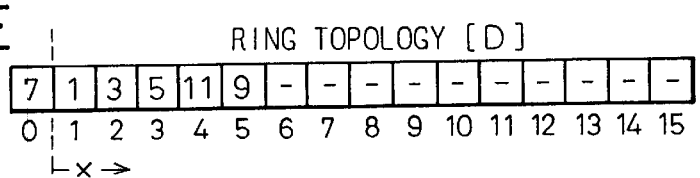
Fig.8E
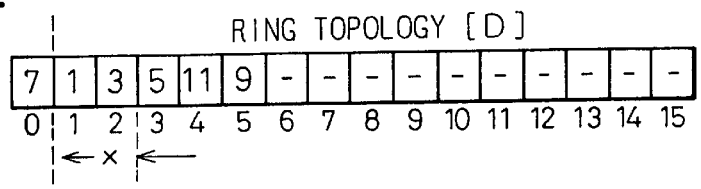
Fig.8F Fig.9A
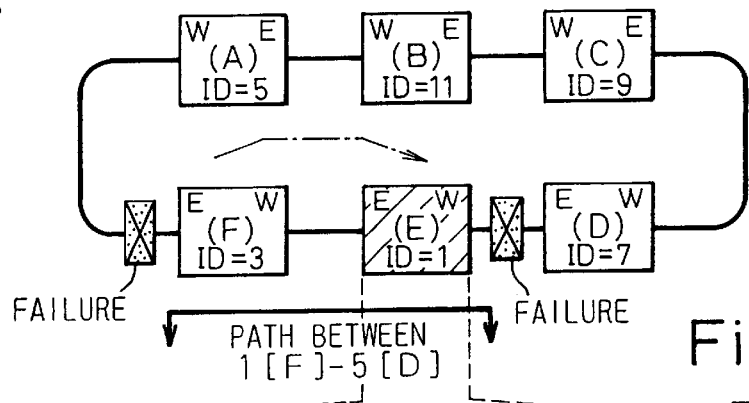
Fig.9B
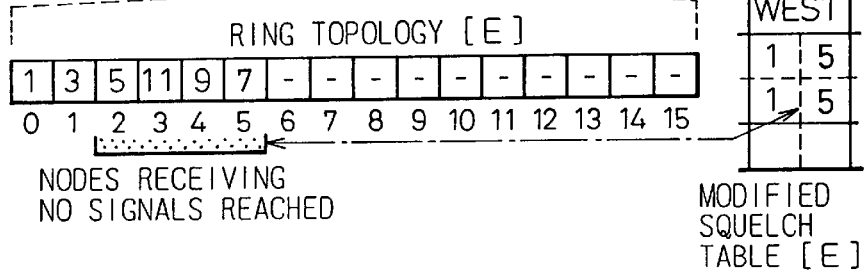
Fig.9C
Fig.9D
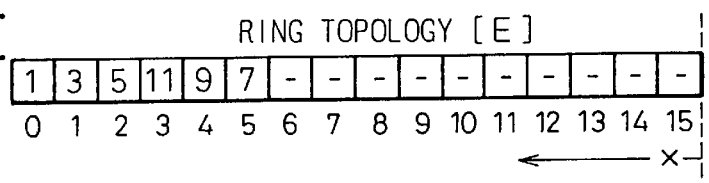
Fig.9E
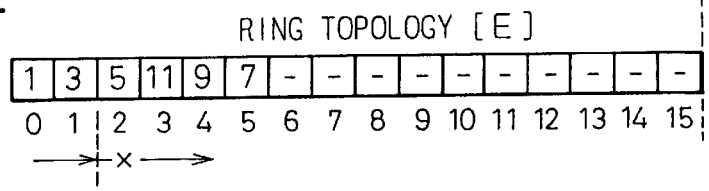
Fig.9F

Fig.23

SQUELCH TABLE [A]

| | EAST | WEST | DIREC |
| --- | --- | --- | --- |
| ch.1 | — | A | E→W |
| --- | — | A | E←W |
| ch.9 | | | --- |
| --- | | | --- |
| ch.17 | | | --- |
| --- | | | --- |

RING TOPOLOGY [A]

| A | B | C | D | E | F |
| --- | --- | --- | --- | --- | --- |
| 0 | 1 | 2 | 3 | 4 | 5 |

SQUELCH TABLE [B]

| | EAST | WEST | DIREC |
| --- | --- | --- | --- |
| ch.1 | — | — | E→W |
| --- | — | — | E←W |
| ch.9 | | | E→W |
| --- | | | E←W |
| ch.17 | | | E→W |
| --- | | | E←W |

RING TOPOLOGY [B]

| B | C | D | E | F | A |
| --- | --- | --- | --- | --- | --- |
| 0 | 1 | 2 | 3 | 4 | 5 |

SQUELCH TABLE [C]

| | EAST | WEST | DIREC |
| --- | --- | --- | --- |
| ch.1 | — | — | E→W |
| --- | — | — | E←W |
| ch.9 | | | E→W |
| --- | | | E←W |
| ch.17 | | | E→W |
| --- | | | E←W |

RING TOPOLOGY [C]

| C | D | E | F | A | B |
| --- | --- | --- | --- | --- | --- |
| 0 | 1 | 2 | 3 | 4 | 5 |

Fig. 24

SQUELCH TABLE [F]

| | EAST | | WEST | | DIREC |
|---|---|---|---|---|---|
| ch.1 | A | D | | | E→W |
| | A | D | | | E←W |
| --- | | | | | --- |
| ch.9 | | | | | E→W |
| | | | | | E←W |
| --- | | | | | --- |
| ch.17 | | | | | E→W |
| | | | | | E←W |
| --- | | | | | --- |

RING TOPOLOGY [F]

| F | A | B | C | D | E | 5 |
|---|---|---|---|---|---|---|
| 0 | 1 | 2 | 3 | 4 | 5 | |

SQUELCH TABLE [E]

| | EAST | | WEST | | DIREC |
|---|---|---|---|---|---|
| ch.1 | A | D | A | D | E→W |
| | A | D | A | D | E←W |
| --- | | | | | --- |
| ch.9 | | | | | E→W |
| | | | | | E←W |
| --- | | | | | --- |
| ch.17 | | | | | E→W |
| | | | | | E←W |
| --- | | | | | --- |

RING TOPOLOGY [E]

| E | F | A | B | C | D | 5 |
|---|---|---|---|---|---|---|
| 0 | 1 | 2 | 3 | 4 | 5 | |

SQUELCH TABLE [D]

| | EAST | | WEST | | DIREC |
|---|---|---|---|---|---|
| ch.1 | A | D | | | E→W |
| | A | D | | | E←W |
| --- | | | | | --- |
| ch.9 | | | | | E→W |
| | | | | | E←W |
| --- | | | | | --- |
| ch.17 | | | | | E→W |
| | | | | | E←W |
| --- | | | | | --- |

RING TOPOLOGY [D]

| D | E | F | A | B | C | 5 |
|---|---|---|---|---|---|---|
| 0 | 1 | 2 | 3 | 4 | 5 | |

Fig.26

SQUELCH TABLE [A]

| | EAST | WEST | DIREC |
|---|---|---|---|
| ch.1 | B\|A | A\|F | E→W |
| | B\|A | A\|F | E←W |
| --- | | | |
| ch.9 | C\|A | A\|E | E→W |
| | C\|A | A\|E | E←W |
| --- | | | |
| ch.17 | D\|A | A\|D | E→W |
| | D\|A | A\|D | E←W |
| --- | | | |

RING TOPOLOGY [A]

| A | B | C | D | E | F | 5 |
|---|---|---|---|---|---|---|
| 0 | 1 | 2 | 3 | 4 | 5 | |

SQUELCH TABLE [B]

| | EAST | WEST | DIREC |
|---|---|---|---|
| ch.1 | —\|— | B\|A | E→W |
| | —\|— | B\|A | E←W |
| --- | | | |
| ch.9 | C\|A | C\|A | E→W |
| | C\|A | C\|A | E←W |
| --- | | | |
| ch.17 | D\|A | D\|A | E→W |
| | D\|A | D\|A | E←W |
| --- | | | |

RING TOPOLOGY [B]

| B | C | D | E | F | A | 5 |
|---|---|---|---|---|---|---|
| 0 | 1 | 2 | 3 | 4 | 5 | |

SQUELCH TABLE [C]

| | EAST | WEST | DIREC |
|---|---|---|---|
| ch.1 | —\|— | —\|— | E→W |
| | —\|— | —\|— | E←W |
| --- | | | |
| ch.9 | E\|C | C\|A | E→W |
| | E\|C | C\|A | E←W |
| --- | | | |
| ch.17 | D\|A | D\|A | E→W |
| | D\|A | D\|A | E←W |
| --- | | | |

RING TOPOLOGY [C]

| C | D | E | F | A | B | 5 |
|---|---|---|---|---|---|---|
| 0 | 1 | 2 | 3 | 4 | 5 | |

Fig.27

SQUELCH TABLE [F]

| | EAST | | WEST | | DIREC |
|---|---|---|---|---|---|
| ch.1 | A | F | F | E | E→W |
| | A | F | F | E | E←W |
| --- | | | | | --- |
| ch.9 | E | A | A | E | E→W |
| | E | A | A | E | E←W |
| --- | | | | | --- |
| ch.17 | A | D | A | D | E→W |
| | A | D | A | D | E←W |
| --- | | | | | --- |

RING TOPOLOGY [F]: F A B C D E / 0 1 2 3 4 5 / 5

SQUELCH TABLE [E]

| | EAST | | WEST | | DIREC |
|---|---|---|---|---|---|
| ch.1 | F | E | – | – | E→W |
| | F | E | – | – | E←W |
| --- | | | | | --- |
| ch.9 | A | E | E | C | E→W |
| | A | E | E | C | E←W |
| --- | | | | | --- |
| ch.17 | A | D | A | D | E→W |
| | A | D | A | D | E←W |
| --- | | | | | --- |

RING TOPOLOGY [E]: E F A B C D / 0 1 2 3 4 5 / 5

SQUELCH TABLE [D]

| | EAST | | WEST | | DIREC |
|---|---|---|---|---|---|
| ch.1 | – | – | – | – | E→W |
| | – | – | – | – | E←W |
| --- | | | | | --- |
| ch.9 | E | C | E | C | E→W |
| | E | C | E | C | E←W |
| --- | | | | | --- |
| ch.17 | A | D | A | D | E→W |
| | A | D | A | D | E←W |
| --- | | | | | --- |

RING TOPOLOGY [D]: D E F A B C / 0 1 2 3 4 5 / 5

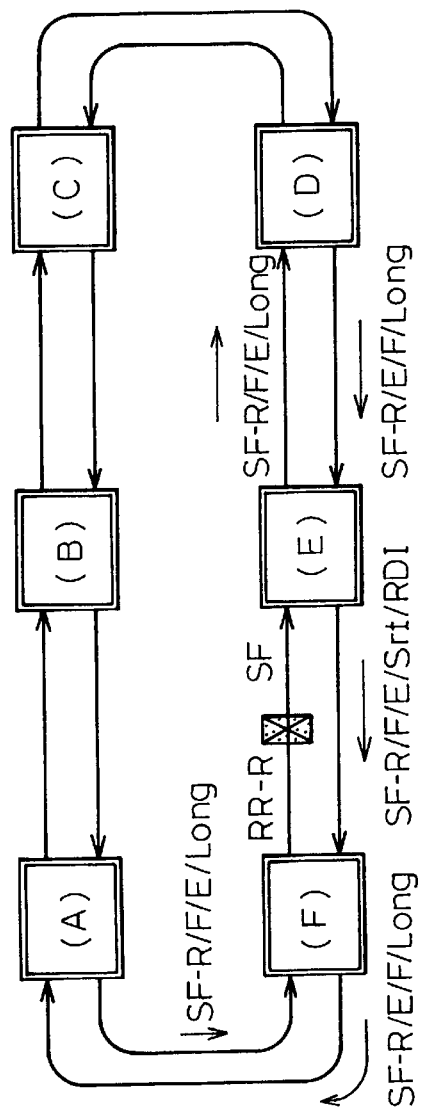
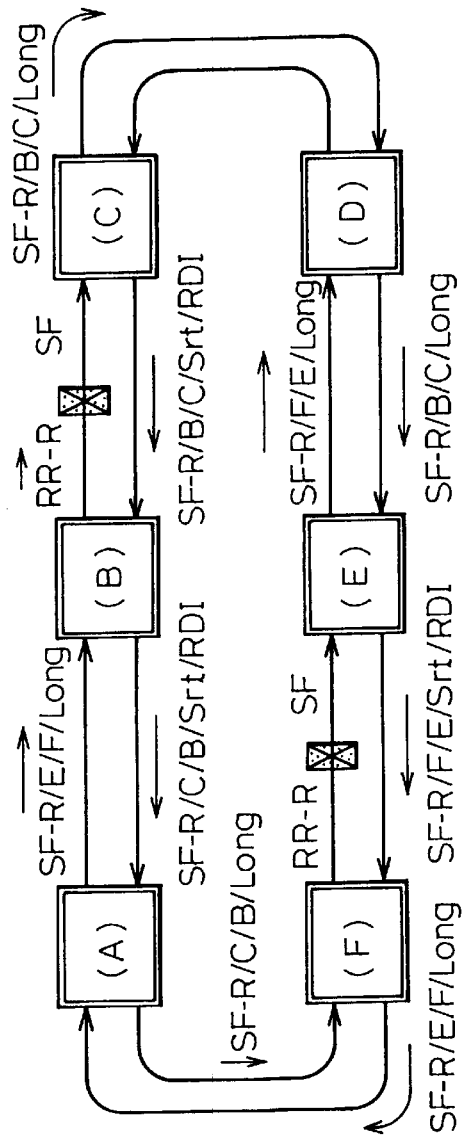

RING TRANSMISSION SYSTEM AND SQUELCH METHOD USED FOR SAME

This application is a continuation of U.S. application No. 08/712,141, filed Sep. 11, 1996, which is now U.S. Pat. No. 6,122,250.

BACKGROUND OF THE INVENTION

1. Field of the Invention

The present invention relates to a ring transmission system of the bi-directional line switched ring type and to a squelch method of the system.

Systems of a plurality of nodes connected by ring transmission lines can be roughly classified into the uni-directional path switched ring (UPSR) type and the bi-directional line switched ring (BLSR) type.

Compared with the former uni-directional path switched ring type, the latter bi-directional line switched ring type enables use of the same channel among different nodes and thus has the advantage that the line capacity can be made larger. In this bi-directional line switched ring type, when a failure occurs at a number of positions and the ring transmission line is disconnected, a signal which cannot reach its destination node is generated. That signal is sometimes transmitted to another node by the loopback function used so as to repair the failure. In this case, erroneous inter-node communication would occur, therefore a so-called "squelch" operation in which the signal which cannot reach its destination node is replaced by a path alarm indication signal (P-AIS) which is transmitted instead is carried out. There is a demand for this squelch processing to be carried out with a good efficiency and at a high speed.

2. Description of the Related Art

As will be explained in detail later by using the drawings, a squelch table is formed at each node in correspondence with the channels using the ID numbers of the transmission nodes (nodes to which the signals are added) and the ID numbers of the reception nodes (nodes on which the signals are dropped) at the time of setting up the communication channels among the nodes. When all of the control for insertion of a squelch operation using this squelch table when a number of failures occur is carried out by software, the processing for searching through the squelch table based on the ID numbers for the nodes not able to receive signals is carried out in correspondence with the channels by a processor. In this case, the collation and comparison of the ID numbers are carried out one after the other, therefore there is the problem that a long time is required for a squelch decision.

Further, in a bi-directional line switched ring (BLSR) type ring transmission system comprised of optical fiber transmission lines of a length of 1200 km and 16 nodes, it is desired that the time from the detection of a failure to the loopback for repairing the failure and the completion of the switch between the working and protection lines be not more than 50 ms. Further, when a plurality of failures occur, it has been desired that the time be not more than 100 ms. Accordingly, it becomes necessary to carry out the switching at a high speed after the detection of a failure. Further, in the case of a plurality of failures, squelch processing becomes necessary, so this squelch processing must also be carried out at a higher speed.

Therefore, consideration may be given to a configuration which enables all of the squelch processing to be all carried out by hardware. However, since a squelch table stores the node ID numbers in correspondence with the channels and in correspondence with the transmission or reception direction of the signals, there is a problem that the circuit configuration for collating and comparing the squelch table and the ID numbers of the nodes which signals cannot reach due to a plurality of failures becomes very complex and large in scale, thus realization is difficult.

SUMMARY OF THE INVENTION

Therefore, an object of the present invention is to achieve an increase of the speed of the squelch processing without an increase of the size of the circuit.

To attain the above object, the present invention provides a ring transmission system, for example, of a bidirectional line switched ring (BLSR) type comprising nodes (A) to (F) connected by ring transmission lines RL, wherein the nodes (A) to (F) have modified squelch tables [A] to [F] and squelch decision units. The ring topology is built by transmitting a ring topology frame and inserting the ID of each node in that frame. Each of the nodes creates a modified squelch table comprised of modified node IDs given to the nodes in a rising order of connection starting from itself using itself as "0" or another reference value. Whether or not to perform a squelch operation is determined by comparing the magnitude of the modified node IDs of the nodes which signals cannot reach at the time of occurrence of a failure and the modified node IDs in the modified squelch table. This enables the squelch processing to be performed at a high speed.

BRIEF DESCRIPTION OF THE DRAWINGS

The above object and features of the present invention will be more apparent from the following description of the preferred embodiments with reference to the accompanying drawings, wherein:

FIG. 5 is an explanatory view of the unit configuration of a node;

FIGS. 8A, 8B, 8C, 8D, 8E, and 8F are explanatory views of a squelch decision (first);

FIGS. 9A, 9B, 9C, 9D, 9E, and 9F are explanatory views of a squelch decision (second);

FIG. 23 is an explanatory view of a squelch table when a service selector is activated (first);

FIG. 24 is an explanatory view of the squelch table when a service selector is activated (second);

FIG. 26 is an explanatory view of a squelch table (first);

FIG. 27 is an explanatory view of a squelch table (second);

FIG. 29 is an explanatory view of a modified squelch table (first);

FIG. 30 is an explanatory view of a modified squelch table (second);

FIGS. 35A and 35B are explanatory views of discrimination between a single failure and a plurality of failures.

DESCRIPTION OF THE PREFERRED EMBODIMENTS

Before describing the embodiments of the present invention, the related art and the disadvantages therein will be described in further detail with reference to the related figures.

Figure 31A:
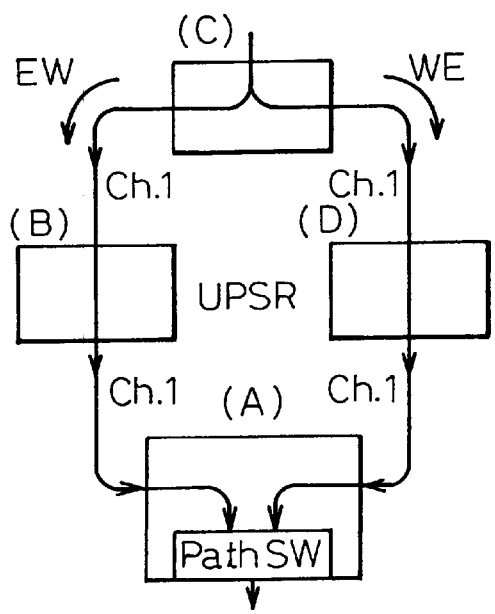
FIGS. 31A, 31B, 31C, and 31D are explanatory views of repair of a failure.
Figure 31C:
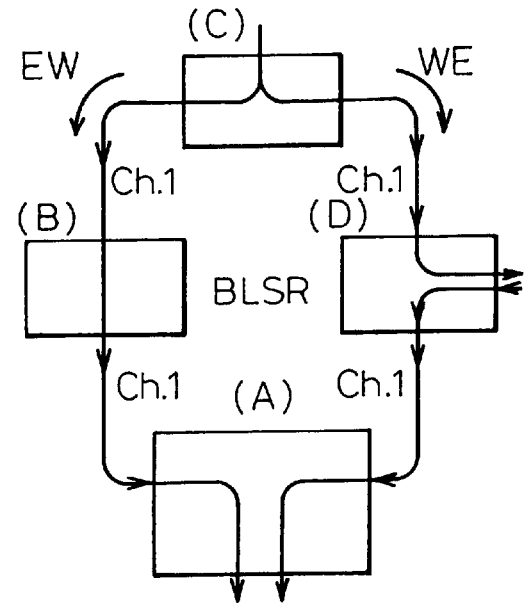
Figure 31B:
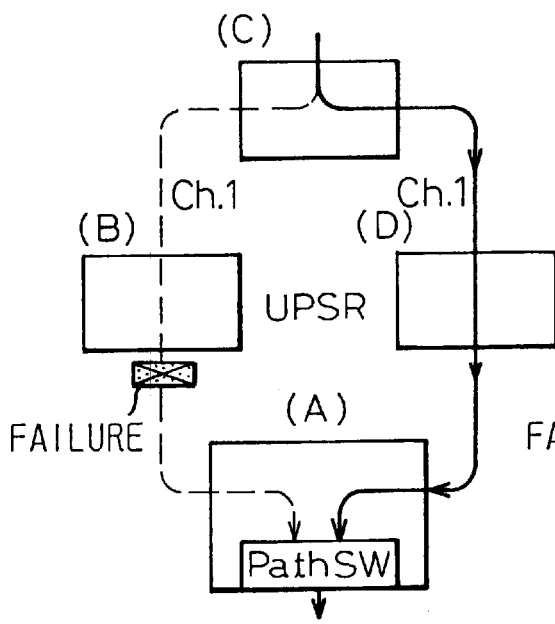

FIGS. 31A, 31B, 31C, and 31D are explanatory views of repair of a failure, in which a uni-directional path switched ring (UPSR) type transmits the same signal from a node (C) to an EW (East→West) side of the node (B) direction and to a WE (West→East) side of the node (D) direction by for example a channel ch.1 as shown in FIG. 31A, and the node (A) selectively receives the signal of the channel ch.1 by a path switch PathSW. Accordingly, for example, even if a failure occurs between the nodes (A) and (B) as shown in FIG. 31B, the node (A) can selectively receive the signal of the channel ch.1 via the node (D) by the path switch PathSW, therefore the communication between the nodes (C) and (A) can be still maintained.

In the bi-directional line switched ring (BLSR) type, as shown in FIG. 31C, the node (C) transmits the signal to the node (A) by for example the EW side channel ch.1 and transmits the signal to the node (D) by the channel ch.1 on the WE side, while the node (D) can transmit the signal to the node (A) by the channel ch.1 on the WE side. Namely, by using the same channel ch.1, communication, for example, between the nodes (C) and (A), between nodes (C) and (D), and between the nodes (D) and (A) become possible, so the line capacity can be made larger in comparison with the unidirectional line switched ring (UPSR) type.

Figure 31D:
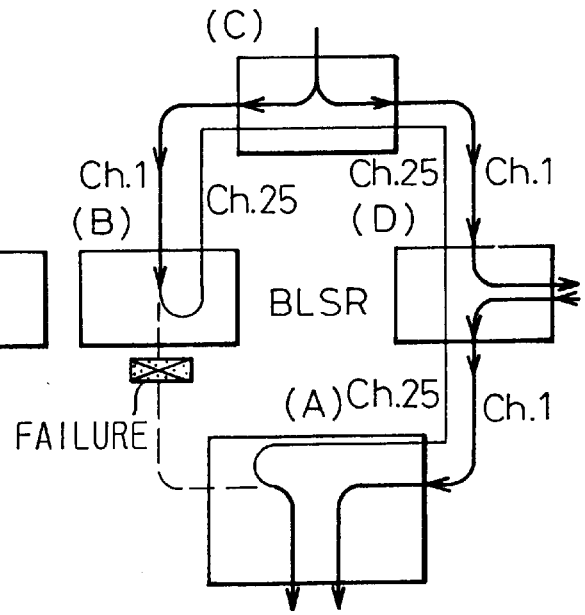

In this bi-directional line switched ring (BLSR) type, as shown in FIG. 31D, if a failure occurs between the nodes (A) and (B), it is repaired by the automatic protection switch (APS) protocol. At the node (B), for example, the channel ch.1 is looped back to the channel ch.25 of the protection line indicated by the thin line. At the node (A), the channel ch.25 of the protection line is switched to the channel ch.1. By switching the signal from the node (C) transmitted on the channel ch.1 to the channel ch.25 of the protection line at the node (B) and looping it back and switching the channel ch.25 of the protection line to the channel ch.1 of the working line at the node (A), the communication between the channels (C) and (A) can be still maintained. Note that, the signal between the nodes (C) and (D) and the signal between the nodes (D) and (A) do not pass between the nodes (A) and (B), therefore the communication is carried out by the channel ch.1.

Figure 32:
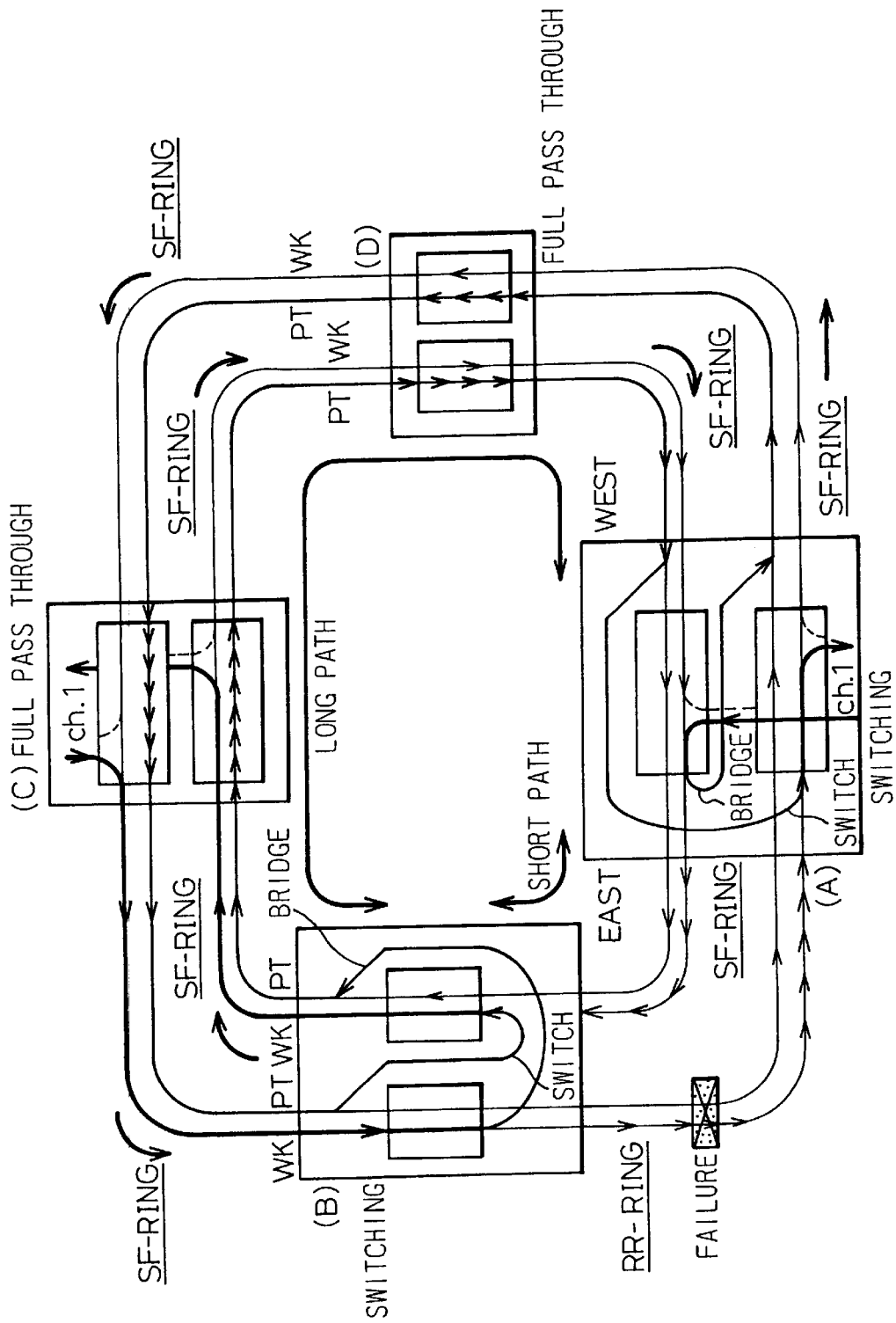
FIG. 32 is an explanatory view of an automatic protection switch (APS) protocol.

FIG. 32 is an explanatory view of the automatic protection switch (APS) protocol, in which WK denote working lines, and PT denote protection lines. Assume that a failure occurs between the nodes (A) and (B). In this case, the node (A) detecting an alarm becomes the switching node and transmits a request indicating the transmission line failure (SF-RING: Signal Failure Ring) to both of the short path and long path with respect to the opposing node (B). The nodes (D) and (C) receiving the request via the long path identify the destination (B) of the request and when recognizing that they are not the destination enter into a "full pass through" state and allow the K1 and K2 bytes and protection line channels to pass therethrough.

Further, the node (B) receiving the request via the short path becomes the switching node and transmits a reverse request (RR-RING: Reverse Request Ring) to the short path and a request the same as the received request (SF-RING) to the long path. In the case of a failure in the transmission line, when receiving a request via the long path, a bridge and switch are simultaneously formed. The bridge represents a state where the same traffic is sent out to the working and protection channels, while a switch represents a state where the traffic from the protection channel is selected.

Accordingly, due to the occurrence of a failure between the nodes (B) and (A), in the node (A), a bridge for transmitting the signal to the node (C) over the protection line PT is formed. This protection line PT forms at the node (B) a switch for transmitting the signal over the working line WK from the node (B) toward the node (C). Further, in the node (B), a bridge for looping back to the protection line PT the signal from the node (C) to the node (A) via the working line WK is formed. In the node (A), a switch for switching from this protection line PT to the working line is formed. Accordingly, the communication between the nodes (A) and (C) is still maintained.

Figure 33:
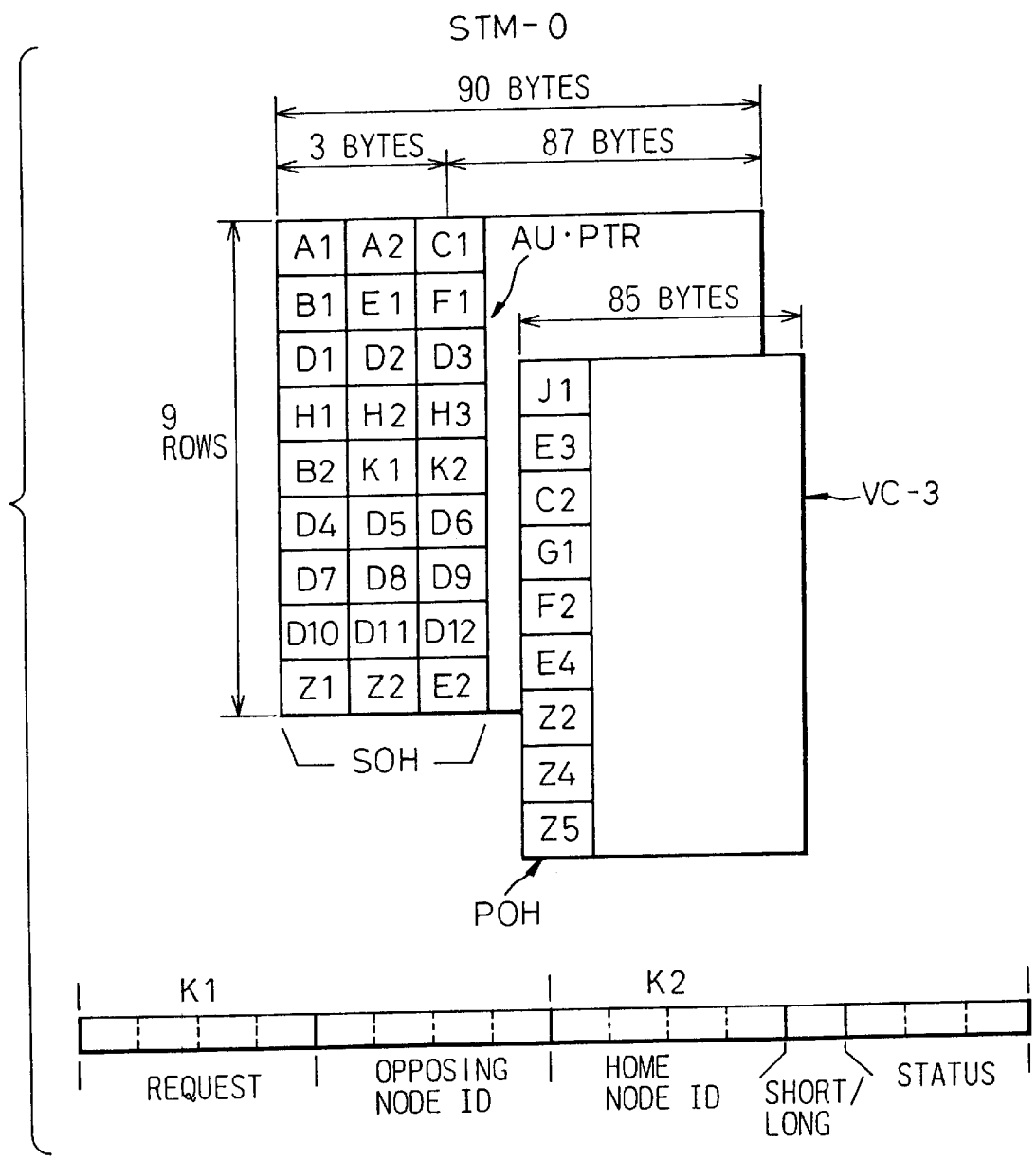
FIG. 33 is an explanatory view of a header and K1 and K2 bytes.

FIG. 33 is an explanatory view of the header and the K1 and K2 bytes and shows a frame configuration of a synchronous transport module (STM)-0 (52 Mbps) consisting of 9 rows×90 bytes and a virtual container VC-3 consisting of 9 rows×85 bytes. The section overhead SOH consisting of 9 rows×3 bytes in the STM-0 frame includes the bytes of the framing bytes A1 and A2, STM-1 ID number C1, error monitor B1, orderwire E1, failure identification F1, data communications D1 to D3, pointers (AU PRT) H1 to H3, error monitor B2, APS use K1 and K2, data communications D4 to D12, standby bytes Z1 and Z2 and an orderwire E2.

Further, the path overhead POH includes the bytes of a path connection monitor J1, path error monitor B3, path information ID C2, error notification G1, maintenance channel F2, indicator H4 of the multi-frame number, and standby bytes Z3 to Z5. VC-3 is multiplexed on the payload of the 9 rows×87 bytes of the STM-0. Further, the STM-1 (156 Mbps) is comprised by multiplexing the STM-0 in triplicate.

Further, the K1 byte in the section overhead SOH is comprised by a request of first to fourth bits and an opposing office ID of fifth to eighth bits (ID number of the destination node of K1 byte), while the K2 byte is comprised by a home office ID (ID number of the request originating node) of the first to fourth bits, a fifth bit indicating whether the request is a short path request ("0") or a long path request ("1"), and a status of the sixth to eighth bits. A request in the K1 byte represents the SF-RING mentioned before by "1011", represents the RR-RING mentioned before by "0001", and represents "no request" by "0000". Further, the status in the K2 byte represents an alarm indication signal (AIS) by "111". The same is true also in the STS-1 signal of SONET (52 Mbps).

Figure 34:
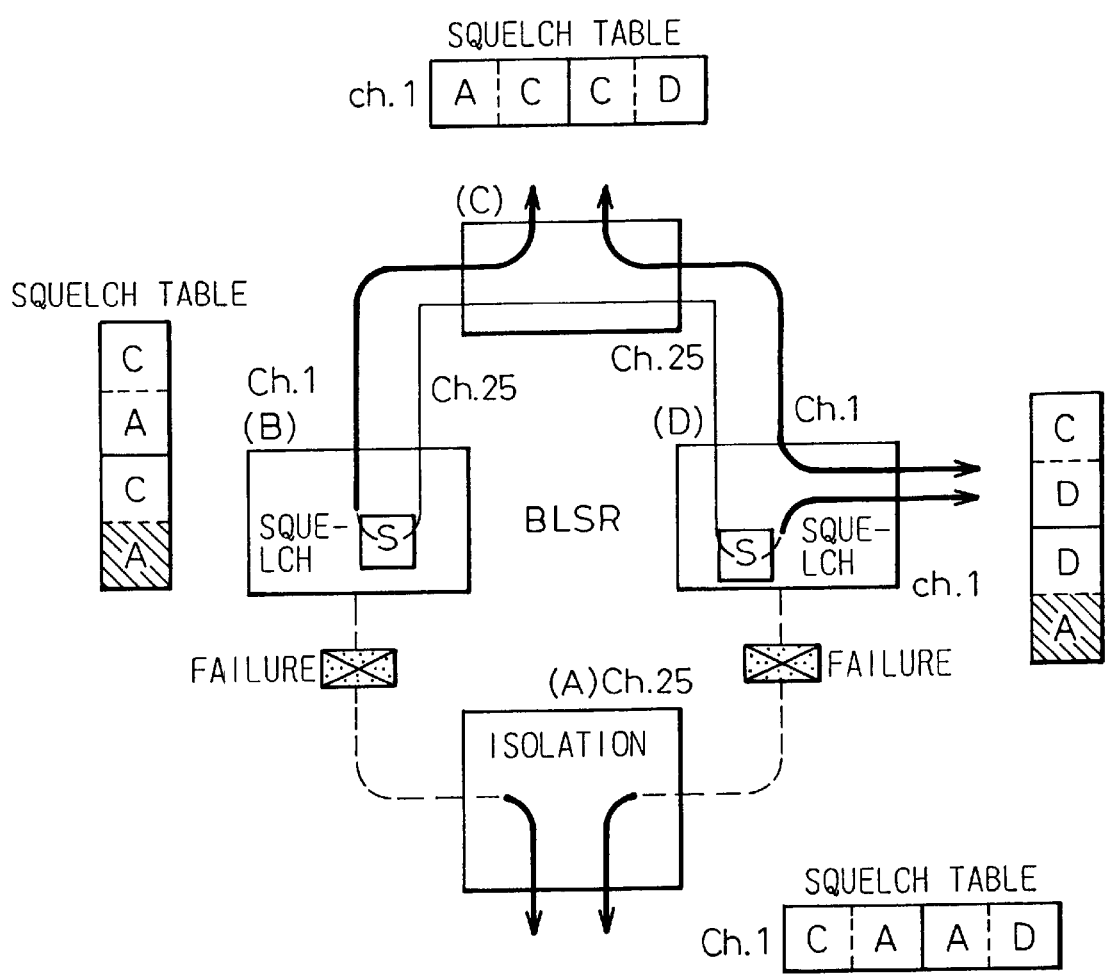
FIG. 34 is an explanatory view of a squelch operation.

FIG. 34 is an explanatory view of the squelch operation. As mentioned before, when the communication is carried out by using the channel ch.1 between the nodes (A) and (C), between the nodes (A) and (D), and between the nodes (C) and (D), the squelch tables corresponding to the channel ch.1 of each node store the IDs of the transmission nodes (nodes to which the signals are added) and the reception nodes (nodes on which the signals are dropped) for every transmission direction of the signals. For example the squelch table in the node (C) stores the ID of the reception node (A) and the ID of the transmission node (C) to be transmitted to the node (B) side and the ID of the reception node (D) and the ID of the transmission node (C) to be transmitted to the node (D) side. Namely, the node ID numbers are stored in terms of arrangements of the transmission nodes and reception nodes according to the signal transmission direction.

When failures occur between the nodes (A) and (B) and between the nodes (A) and (D), the node (A) will be isolated. When connection is made at the node (B) assuming that the channel ch.1 of the working line is looped back to the channel ch.25 of the protection line and at the node (D) assuming that the channel ch.1 between the node (D) and the node (A) is looped back to the channel ch.25 of the protection line, erroneous connection occurs where the signal of the node (A) is transmitted to the node (D).

Therefore, it can be found that, when looking up the squelch tables of the nodes (B) and (C) which are working as the switching nodes, there are signals destinated to the node (A), even though the node (A) is now unable to receive such signals. Therefore, in the node (B), a squelch (path alarm indication signal: P-AIS) indicated by S in the figure is inserted into the channel ch.25 of the protection line to be looped back to the node (A). In the node (D), a squelch (path alarm indication signal: P-AIS) indicated by S is inserted into the channel ch.1 of the working line with the node (A) switched from the protection line. The erroneous connection state can be avoided by this squelch.

FIGS. 35A and 35B are explanatory views of a decision of whether the failure is a single failure or a plurality of failures. In FIG. 35A, when a failure occurs between the nodes (F) and (E) and the node (E) detects the transmission line failure SF (Signal Fail), it transmits to the opposing node (F) a request (transmission line failure) indicated by SF-R/F/E/Long via the long path to the node (D) side and a request (transmission line failure) indicated by SF-R/F/E/Srt/RDI via the short path to the node (F) side. The node (F) can receive requests addressed to itself through the short path and long path from the opposing node (E) and therefore it can decide whether there is a single failure between the nodes (F) and (E).

Further, FIG. 35B shows a case where failures occur between the nodes (B) and (C) and between the nodes (F) and (E), the node (C) detects the transmission line failure SF, and the node (E) detects the transmission line failure SF. The node (C) transmits the requests (transmission line failure) SF-R/B/C/Long and SFR/B/C/Srt/RDI through the long path and the short path to the opposing node (B). The node (B) receiving the request SF-R/B/C/Srt/RDI via the short path transmits the request SF-R/C/B/Long via the long path to the node (C).

In the same way as the case of FIG. 35A, the node (E) detecting the transmission line failure SF transmits the requests SF-R/F/E/Long and SF-R/F/E/Srt/RDI through the long path and the short path to the opposing node (F). The node (F) transmits the request SF-R/E/F/Long via the long path to the node (E) by the request SF-R/F/E/Srt/RDI via the short path.

Accordingly, the node (F) can determine that a plurality of failures have occurred between the nodes (F) and (E) and between the nodes (B) and (C) since the request SF-R/F/E/Srt/RDI via the short path was addressed to it from the node (E), while the request SF-R/C/B/Long via the long path was not addressed to it, but was addressed to another node (C) from the node (B).

The node status changes among an idle state, a switching state, and a pass through state. In the normal case, it is in the idle state. When a failure occurs, each node changes to either of a switching state forming either or both of a bridge for switching the signal of the working line channel to the protection line channel and a switch for returning from the protection line channel to the working line channel or a pass through state where it is located between nodes of this switching state.

Further, the automatic protection switch (APS) protocol is executed between the nodes straddling the point where the failure occurred at the side where the failure occurred (short path) and the opposing side (long path). The nodes at intermediate positions thereof enter into the pass through state and monitor the automatic protection switch (APS) protocol, but do not terminate the K bytes of the automatic protection switch (APS) code. Then, a squelch operation is carried out to insert a P-AIS to the channels which are no longer in the normal connection state due to the occurrence of a plurality of failures.

According to the conventional automatic protection switch (APS) protocol mentioned above, however, there are several problems, as already mentioned, that is:

(i) A squelch table is formed at each node in correspondence with the channels using the ID numbers of the transmission nodes (nodes to which the signals are added) and the ID numbers of the reception nodes (nodes on which the signals are dropped) at the time of setting up the communication channels among the nodes. When all of the control for insertion of a squelch operation using this squelch table when a number of failures occur is carried out by software, the processing for searching through the squelch table based on the ID numbers for the nodes not able to receive signals is carried out in correspondence with the channels by a processor. In this case, the collation and comparison of the ID numbers are carried out one after the other, therefore there is the problem that a long time is required for a squelch decision.

(ii) Further, in a bidirectional line switched ring (BLSR) type ring transmission system comprised of optical fiber transmission lines of a length of 1200 km and 16 nodes, it is desired that the time from the detection of a failure to the loopback for repairing the failure and the completion of the switch between the working and protection lines be not more than 50 ms. Further, when a plurality of failures occur, it has been desired that the time be not more than 100 ms. Accordingly, it becomes necessary to carry out the switching at a high speed after the detection of a failure. Further, in the case of a plurality of failures, squelch processing becomes necessary, so this squelch processing must also be carried out at a higher speed.

(iii) Therefore, consideration may be given to a configuration which enables all of the squelch processing to be all carried out by hardware. However, since a squelch table stores the node ID numbers in correspondence with the channels and in correspondence with the transmission or reception direction of the signals, there is a problem that the circuit configuration for collating and comparing the squelch table and the ID numbers of the nodes which signals cannot reach due to a plurality of failures becomes very complex and large in scale, thus realization is difficult.

The present invention provides a technique, explained in detail below, which enables achievement of an increase of speed of the squelch processing without an increase of the size of the circuit.

In a first aspect of the invention, there is provided a bi-directional line switched ring (BLSR) type ring transmission system comprised of a plurality of nodes connected by ring transmission lines, wherein each node is provided with a modified squelch table establishing a correspondence between modified node ID numbers showing the order, taking each node as a reference, of connection of nodes to the ring transmission line and the regular ID numbers of the nodes, thus using the modified node ID numbers to show pairs of communicating nodes and is provided with a squelch decision unit performing a squelch decision by a comparison of the magnitude between the modified node ID numbers indicating the pairs of communicating nodes stored in this modified squelch table and the modified node ID numbers of the nodes which signals cannot reach due to occurrence of a failure.

In a second aspect of the invention, each node is provided with a controller unit for managing a ring topology and the squelch table; a switch handling unit carrying out an automatic protection switch (APS) protocol upon detection of a transmission line failure, detection of degradation of a signal quality, and detection of removal of the main signal handling units of the two sides and performing a switch request; and a main signal handling unit. This main signal handling unit has a line switch which performs a switch operation upon a switch request from the switch handling unit, a modified squelch table created based on the ring topology and squelch table of the controller unit, a squelch decision unit performing a squelch decision by referring to this modified squelch table, and a squelch execution unit carrying out a squelch operation according to the result of the squelch decision.

In a third aspect of the present invention, there is provided a squelch method adopted to a bi-directional line switched ring (BLSR) type ring transmission system comprised of a plurality of nodes connected by the ring transmission lines, which includes a step where, when building the ring topology necessary for forming the squelch table, the node issuing the command for building the ring topology transmits a ring topology frame in which its own ID number is added at the start, a step where the next node receiving this frame inserts its own ID number in the order of receipt and then transfers the same, and a step where each node builds a ring topology using its own ID number as the start based on the order of the node ID numbers inserted into the frame after passing around the ring transmission line.

In a fourth aspect of the present invention, there are further provided a step where each node assigns modified node ID numbers to other nodes in a rising or descending order from itself as a reference based on the ring topology and a step where each node creates a modified squelch table having the modified node ID numbers obtained by translating the node ID numbers of the squelch table.

In a fifth aspect of the present invention, each node assigns modified node ID numbers to the other nodes in a rising order making its own modified node ID number "0" and in accordance with the order of connection in a clockwise direction or a counterclockwise direction in the ring transmission lines.

In a sixth aspect of the present invention, there are further provided a step of discriminating the nodes which signals cannot reach when a failure occurs between nodes and a step of performing a squelch decision by a comparison of magnitude between the modified node ID numbers of these nodes and the modified node ID numbers of the modified squelch table.

In a seventh aspect of the present invention, each node decides that a squelch operation is necessary when recognizing by referring to the modified squelch table the existence of a transmission node or a reception node in a sub-ring different from the sub-ring which it belongs to itself among the sub-rings formed by the occurrence of a plurality of failures.

In an eighth aspect of the present invention, the ring transmission lines include working lines and protection lines and there are further provided a step of setting the node status indicating either of an idle state in a normal mode and both a pass through state and a switching state between the East side and the West side at the occurrence of a failure and a step of performing a squelch decision with respect to the protection line channels in accordance with that node status.

In a ninth aspect of the present invention, there is further provided a step of performing a squelch operation before assigning time slots for all drop side protection line channels when the node status indicates the pass through state.

In a 10th aspect of the present invention, there is further provided a step of performing a squelch decision by referring to the modified squelch table by the modified node ID numbers when the node status indicates the switching state and, at the same time, carrying out a squelch operation before assigning time slots for all drop side protection line channels and carrying out a squelch operation for an input portion and output portion of the nodes along the protection line channels.

In an 11th aspect of the present invention, there is provided a squelch method adopted to a bi-directional line switched ring (BLSR) type ring transmission system comprising a plurality of nodes connected by ring transmission lines, which includes a step of compulsorily carrying out a squelch operation for the unused lines when deciding whether or not a squelch operation is necessary due to the occurrence of a failure.

In a 12th aspect of the present invention, each node stores its own ID number or its own modified node ID number for the unused line channels in the squelch table or the modified squelch table.

In a 13th aspect of the present invention, there is further provided a step where each node notifies to the controller unit the results of its decisions, except the result of a compulsory squelch decision on the unused line channels, among the squelch decision results in the main signal handling unit.

Figure 1A:
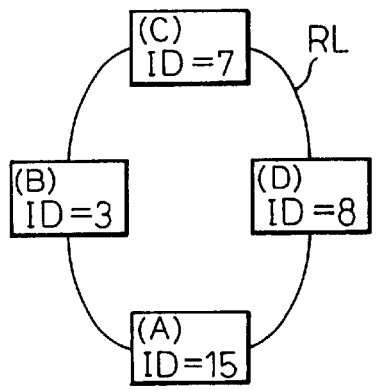
FIGS. 1A, 1B, and 1C are explanatory views of building the ring topology in an embodiment of the present invention.
Figure 1B:
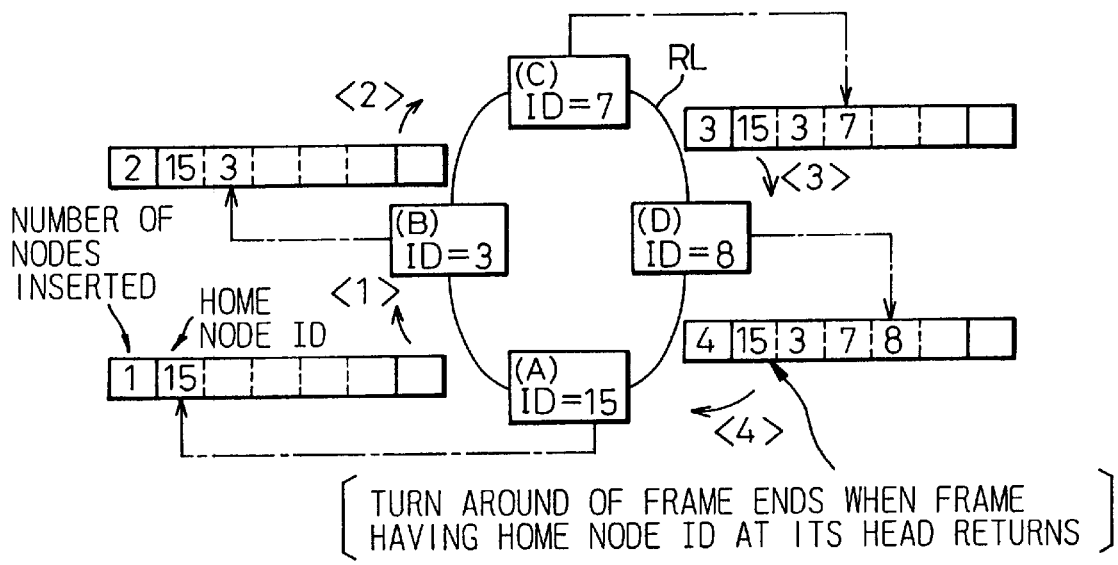
Figure 1C:
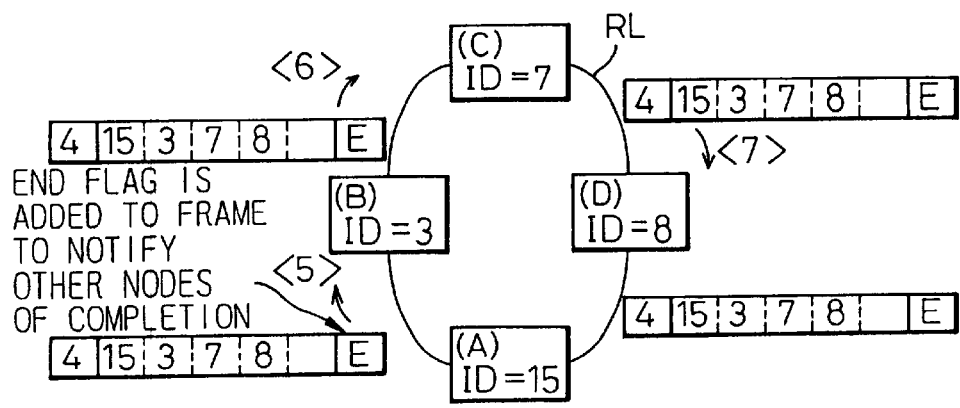

FIGS. 1A to 1C are explanatory views of building a ring topology in an embodiment of the present invention. As shown in FIG. 1A, there is provided a system comprised of four nodes (A) to (D) which are connected by the ring transmission lines RLs. ID numbers are assigned to the respective nodes. For example, ID=15 is assigned to the node (A), ID=3 is assigned to the node (B), ID=7 is assigned to the node (C), and ID=8 is assigned to the node (D), respectively. Next, as shown in FIG. 1B, the node issuing the command for building the ring topology (ring map), for example, the node (A), <1> transmits in for example a clockwise direction a ring topology frame in which "1" is written as the number of the nodes inserted and its own ID is inserted as first. The node (B) <2> rewrites the number of nodes inserted to "2" and inserts its own ID next to the ID of the node (A) and transmits the result. The node (C) <3> rewrites the number of nodes inserted to "3" and inserts its own ID next to the ID of the node (B) and transmits the result. The node (D) <4> rewrites the number of nodes inserted to "4" and inserts its own ID next to ID of the node (C) and transmits the result.

The node (A) determines that the frame made a round trip since the first inserted node ID is its own ID. As shown in FIG. 3C, it then adds an END flag to the end of the ring topology frame and transmits the result to notify the other nodes of the completed ring topology frame <5> to <7>. Each node receiving this ring topology frame builds a ring topology in which it is set as the start. For example, in the node (A), the topology becomes "15, 3, 7, 8", in the node (B), it becomes "3, 7, 8, 15", in the node (C), it becomes "7, 8, 15, 3", and in the node (D), it becomes "8, 15, 3, 7".

By building the ring topology explained above, it becomes easy for a node to transmit its own ID and the destination node ID with the K1 and K2 bytes by the automatic protection switch (APS) protocol. Further, each node creates a squelch table according to this ring topology.

FIGS. 2A and 2B and FIGS. 3A and 3B are views explaining for forming the squelch table. Each of the nodes (A) to (D) has a squelch table where it stores the IDs of the nodes, but for simplification the IDs will be explained by using the same references as those of nodes (A) to (D). For example, where the signal is transmitted and received via the nodes (B) and (A) between the nodes (C) and (D) as in <1> of FIG. 2A, the node (C) inserts its own ID "C" into the principal part of the illustrated table in correspondence with the channels and transmits the same to the node (B) side to notify it that the end office is the node (C), while the node (D) inserts its own ID "D" into the principal part of the illustrated table in correspondence with the channels and transmits the same to the node (A) to notify it that the end office is the node (D). The asterisk marks and the star marks in this case indicate that the destination is unknown.

Figure 2A:
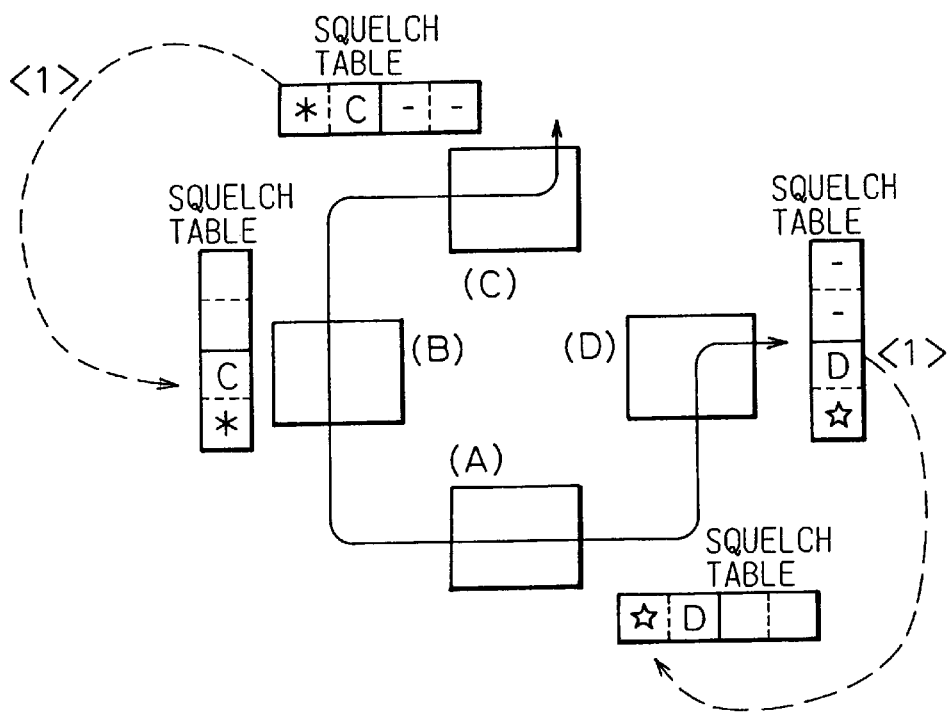
FIGS. 2A and 2B are explanatory views of a method of forming a squelch table (first)
Figure 2B:
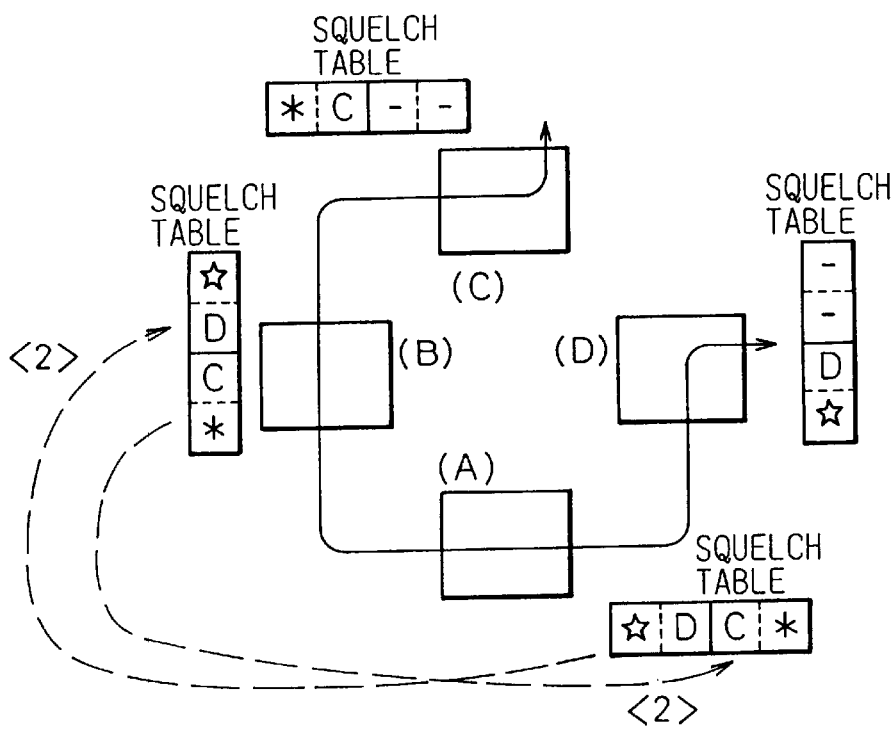

Then, as shown in <2> of FIG. 2B, it is notified to the node (B) from the node (D) via the node (A) that the end office on the node (A) side is the node (D), and it is notified to the node (A) from the node (C) via the node (B) that the end office on the node (B) side is the node (C).

Figure 3A:
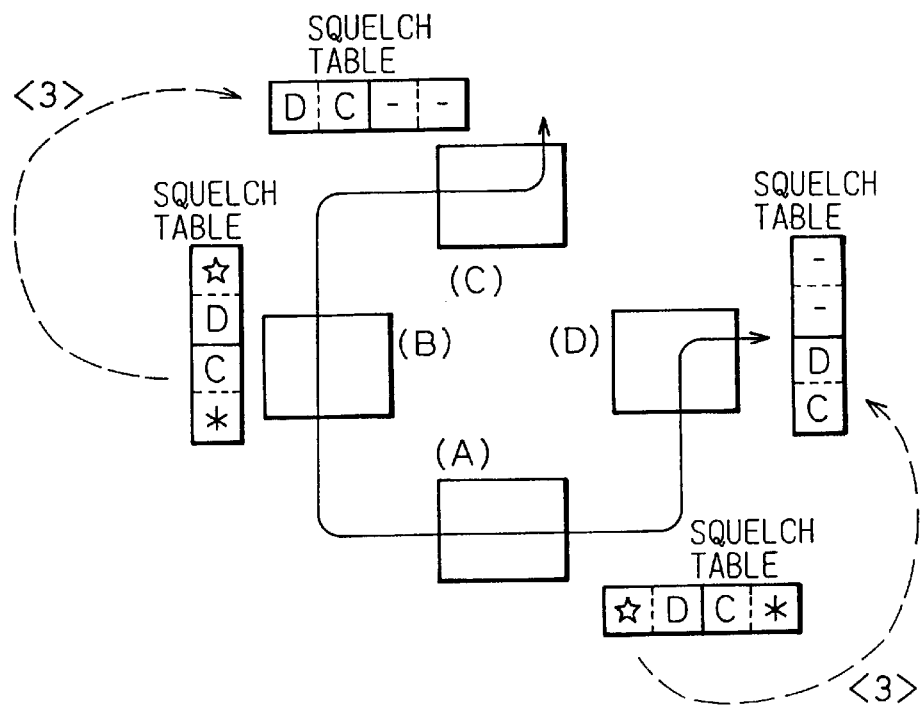
FIGS. 3A and 3B are explanatory views of a method of forming a squelch table (second)

Next, as shown in <3> of FIG. 3A, it is notified to the node (C) via the node (B) that the end office is the node (D), and it is notified to the node (D) via the node (A) that the end office is the node (C). By this, the home node ID "C" and the opposing node ID "D" are set in the squelch table of the node (C), and the home node ID "D" and the opposing node ID "C" are set in the squelch table of the node (D).

Figure 3B:
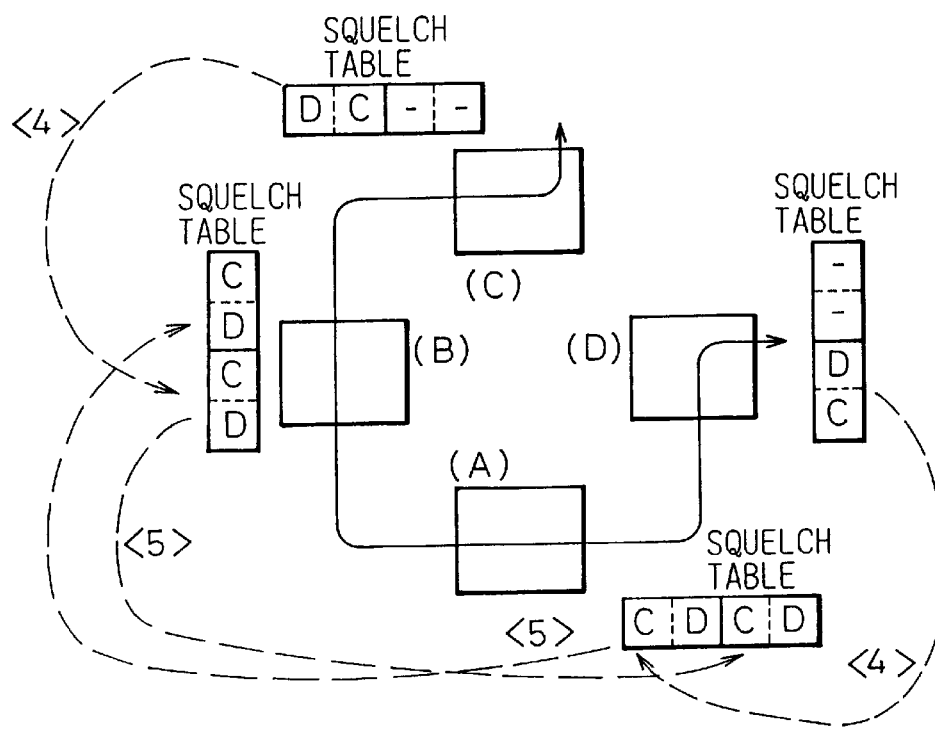

Next, as shown in <4> of FIG. 3B, based on the completed squelch tables of the nodes (C) and (D), it is notified from the node (C) to the node (B) that the unknown destination shown by the asterisk mark is the ID "D" of the node (D). Further, it is notified from the node (D) to the node (A) that the unknown destination shown by the star mark is the ID "C" of the node (C). Further, as shown in <5>, it is notified from the node (B) to the node (A) that the unknown destination shown by the asterisk mark is the ID "D" of the node (D), and it is notified from the node (A) to the node (B) that the unknown destination shown by the star mark is the ID "C" of the node (C). By this, the nodes (A) and (B) also complete squelch tables in correspondence with each channel between the nodes (C) and (D). Further, the same procedure can be followed for updating the squelch tables. Note that at the occurrence of a failure, control is exercised so as to prohibit the updating of the squelch tables.

Figure 4:
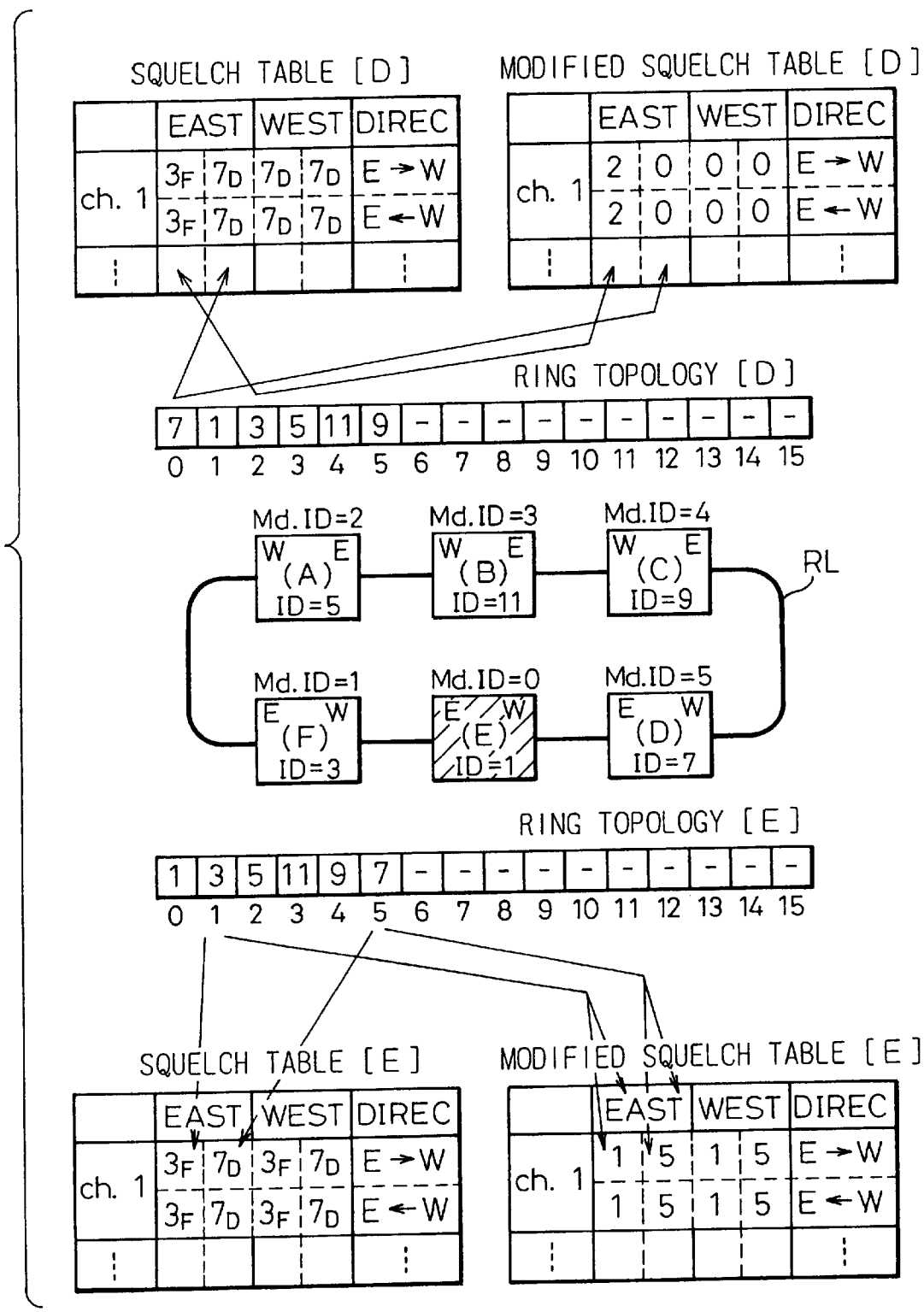
FIG. 4 is an explanatory view of a modified squelch table of an embodiment of the present invention.

FIG. 4 is an explanatory view of a modified squelch table of an embodiment of the present invention. It shows the case of a system comprised of the nodes (A) to (F) connected via the ring transmission lines RLs. The ID numbers of the nodes are assigned as 5, 11, 9, 7, 1, and 3, so the ring topology [D] in the node (D) becomes "7, 1, 3, 5, 11, 9", and the ring topology [E] in the node (E) becomes "1, 3, 5, 11, 6, 7".

The squelch table stores the IDs so that the left side becomes the transmission node (source node to which the signal is added) and the right side becomes the reception node (destination node on which the signal is dropped) for every transmission direction (DIREC) of the signal for the East side and West side of each node where the transmission direction thereof is E→W, and stores the IDs so that the right side becomes the transmission node and the left side becomes the reception node where the transmission direction is E←W. Note that, where an optical fiber transmission line is comprised by the working line channels ch.1 to ch.24 and the protection line channels ch.25 to ch.48, at the occurrence of a failure, the only channels saved by the loopback are the channels ch.1 to ch.24 of the working lines. Therefore the squelch table can also be created for the channels ch.1 to ch.24.

In the squelch table [E] of the node (E), as indicated at the left bottom, it is seen that the transmission node in the case of the East side, that is, in the case of the transmission direction of E→W on the node (F) side, is ID=3 and the reception node is ID=7 and that the transmission node in the case of the West side, that is, in the case of the transmission direction of E→W on the node (D) side, is ID=3 and the reception node is ID=7. Note that, $3_1$ and $7_1$, in the figure indicate that the node IDs of the nodes (F) and (D) are 3 and 7, respectively.

Further, in the squelch table [D] of the node (D), as indicated at the left top, it is seen that the transmission node in the case of the East side, that is, in the case of the transmission direction of E→W on the node (E) side, is ID=3 and the reception node is ID=7, which is the home node. Further, since the West side, that is, the node (C) side, does not perform the transmission and reception, the table stores the ID=7 of the home node as IDs of the transmission node and reception node. Further, it similarly stores the IDs of the nodes also for the transmission direction of E←W.

For example, where failures occur between the nodes (A) and (F) and between the nodes (D) and (E), the node (E) learns that the signal will not reach the nodes having the IDs of 5, 11, 9 and 7 from the West side loopback caused by the failure in the transmission line between the node (E) and the node (D), the conditions of the node ID=1 indicating itself and the ID=3 of the node (F) by the request via the long path from the node (F), and the ring topology. Therefore, for the squelch decision, it compares the IDs of the transmission node and reception node in the squelch table [E]. In this case, ID=7 is the ID of a node which signals cannot reach, therefore the node performs a squelch operation.

As mentioned before, when a node which signals cannot reach is caused due to a number of failures, it is necessary to collate the ID of that node and the IDs of the transmission nodes and reception nodes stored in the squelch table. The need for performing a squelch operation is decided by carrying out the collation corresponding to a plurality of channels, thus the amount of processing involved in the squelch decision was large. Therefore, in the present invention, a modified squelch table is created.

The ring topology stores the IDs of the nodes in the order of connection to the ring transmission lines by setting the ID of each home node at the start. The nodes (D) and (E) therefore end up with the ring topologies [D] and [E] of FIG. 4. There, one's own node is made "0" and subsequent numbers are allocated successively in a rising order. Accordingly, although the ring topology [E] of the node (E) was originally "1, 3, 5, 11, 9, 7" as mentioned before by the IDs of the nodes, the modified node IDs (Md ID) becomes "0, 1, 2, 3, 4, 5". Similarly, although the ring topology [D] of the node (D) was originally "7, 1, 3, 5, 11, 9" by the IDs of the nodes, the modified node IDs (Md ID) becomes "0, 1, 2, 3, 4, 5".

The modified squelch table is created from the squelch table by using these modified node IDs. Accordingly, in the modified squelch table [D] of the node (D), as indicated at the top right, the transmission node in the transmission direction of E→W on the East side becomes the modified node ID=2 (node ID=3), and the reception node in the same direction becomes the modified node ID=0 (node ID=7, home node). Similarly, in the modified squelch table [E] of the node (E), as indicated at the bottom right, the transmission node in the transmission direction of E→W on the East side becomes the modified node ID=1 (node ID=3), and the reception node in the same direction becomes the modified node ID=5 (node ID=7).

Then, as mentioned before, where failures occur between the nodes (D) and (F) and between the nodes (A) and (F), the node (E) learns that the nodes which signals cannot reach are the nodes having the node IDs of 5, 11, 9, and 7 in the above case, but according to the modified node IDs of the present invention, it learns that the signals will not reach the nodes having the IDs of 2 to 5. Namely, it learns that signals will not reach the nodes of the modified node IDs equal to or greater than 2. Accordingly, it carries out the squelch operation with respect to the nodes of the modified node IDs equal to or greater than 2 in the modified squelch table [E]. This means that it is possible to perform a squelch decision by a simple comparison of the magnitude of the modified node IDs and that a squelch decision can be carried out at a high speed by a simple comparator.

FIG. 5 is an explanatory view of the units constituting each node, in which PW is a power source unit, SV is a supervising unit, MP is a microprocessor unit, HS (high speed switch) is a switch handling unit, HR (high speed receiver) (1) and HR(2) are reception interface units, HM (high speed multiplexer) (1) and HM(2) are main signal handling units, and HT (high speed transmitter) (1) and HT(2) are transmission interface units. For example, the reception interface unit HR(1) receives the signal from the East side, and the reception interface unit HR(2) receives the signal from the West side, the transmission interface unit HT(1) transmits the signal to the West side, and the transmission interface unit HT(2) transmits the signal to the East side. Where the transmission line is comprised by an optical fiber, it includes a function of opto-electrical conversion and electro-optical conversion. Further, when the main signal handling unit HM(1) is defined as the working type (WORK), the main signal handling unit HM(2) becomes the protection type (PTCT).

Figure 6:
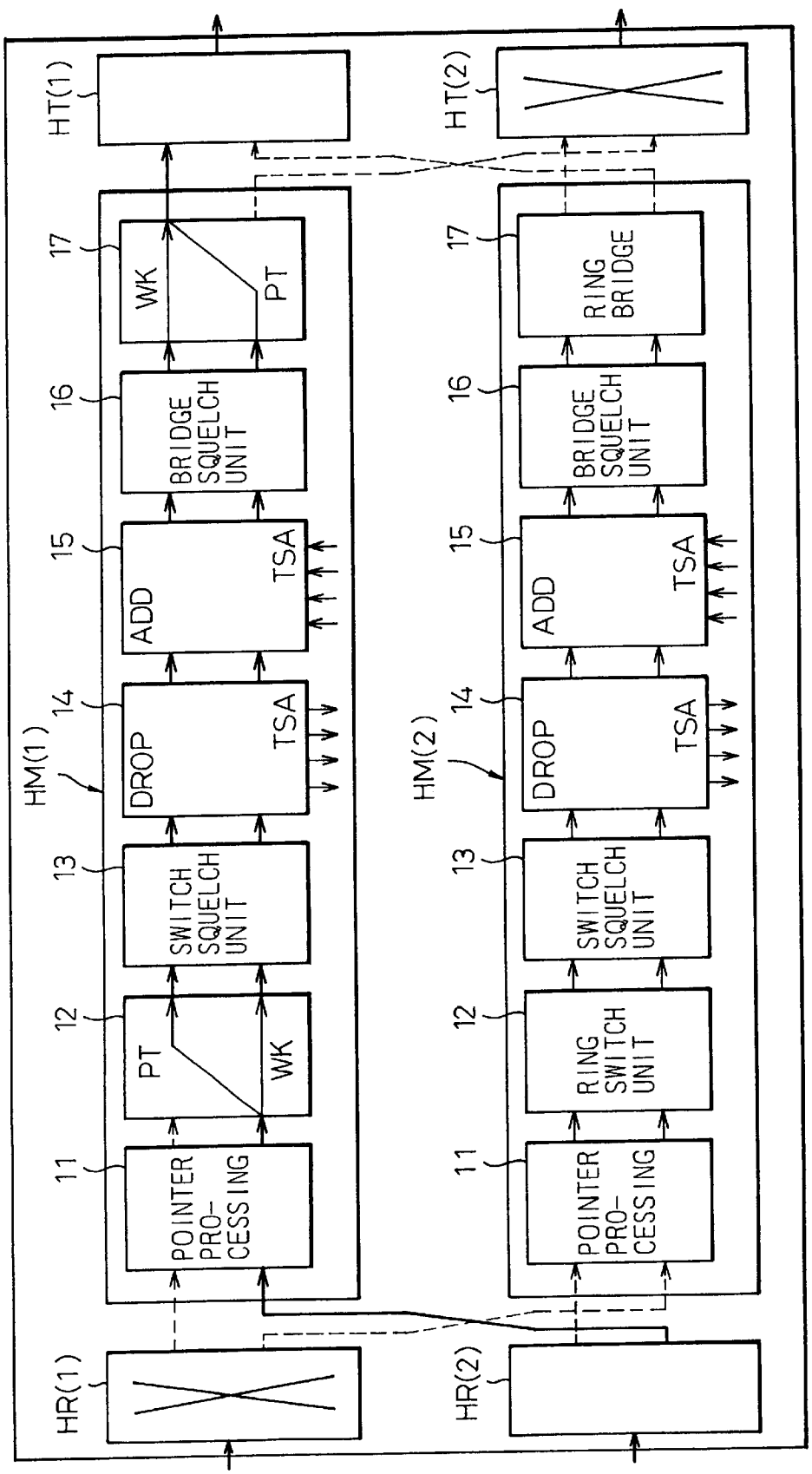
FIG. 6 is an explanatory view of a switch operation in a node when a failure occurs.

FIG. 6 is an explanatory view of the switch operation of the nodes when a failure occurs and shows the switch operation by the reception interface units HR(1) and HR(2), the main signal handling units HM(1) and HM(2), and the transmission interface units HT(1) and HT(2), shown in FIG. 5. The main signal handling units HM(1) and HM(2) have the same structure, in which 11 is a pointer processing unit, 12 is a ring switch unit, 13 is a switch squelch unit, 14 is a drop time slot assignment unit (DROP TSA), 15 is an add time slot assignment unit (ADD TSA), 16 is a bridge squelch unit, and 17 is a ring bridge unit.

Further, the nodes are connected by two transmission lines. Each transmission line has 48 channels. The channels ch.1 to ch.24 among those 48 channels are defined as the working lines (WK) (working line channels), and the channels ch.25 to ch.48 are defined as the protection lines (PT) (protection line channels). Further, the pointer processing unit 11 discriminates the starting position of the signal multiplexed by the pointer comprising the H1 to H3 bytes in for example the section overhead SOH and controls the respective portions.

For example, when a failure occurs on the East side of the node and the reception interface unit HR(1) and the transmission interface unit HT(2) cannot be used as indicated by a mark x in FIG. 6, the ring switch unit 12 in the main signal handling unit HM(1) switches the channels ch.24 to ch.48 of the protection lines on the West side to the channels ch.1 to ch.24 of the working lines on the East side, and the ring bridge unit 17 bridges the channels ch.1 to ch.24 to the channels ch.25 to ch.48 on the West side.

Accordingly, the signal addressed to the home node which is looped back by the channels ch.24 to ch.48 of the protection lines and received from the West side can be dropped in the drop time slot assignment unit 14. Further, the signal inserted into the channels ch.1 to ch.24 of the working lines in the add time slot assignment unit 15 are transmitted through the channels ch.25 to ch.48 of the protection lines from the West side.

Further, the channels ch.1 to ch.24 of the working lines at the West side are bridged to the channels ch.25 to ch.48 of the protection lines by the ring bridge unit 17, and the channels ch.25 to ch.48 of the protection lines at the West side are switched to the channels ch.1 to ch.24 of the working lines in the ring switch unit 13. By this, a loopback returning the signal from the West side to the West side can be formed.

The switch squelch unit 13 and the ring squelch unit 16 carry out a squelch operation for inserting the P-AIS by referring to the modified squelch table when a signal cannot reach the destination node due to the occurrence of a number of failures as mentioned before.

Figure 7:
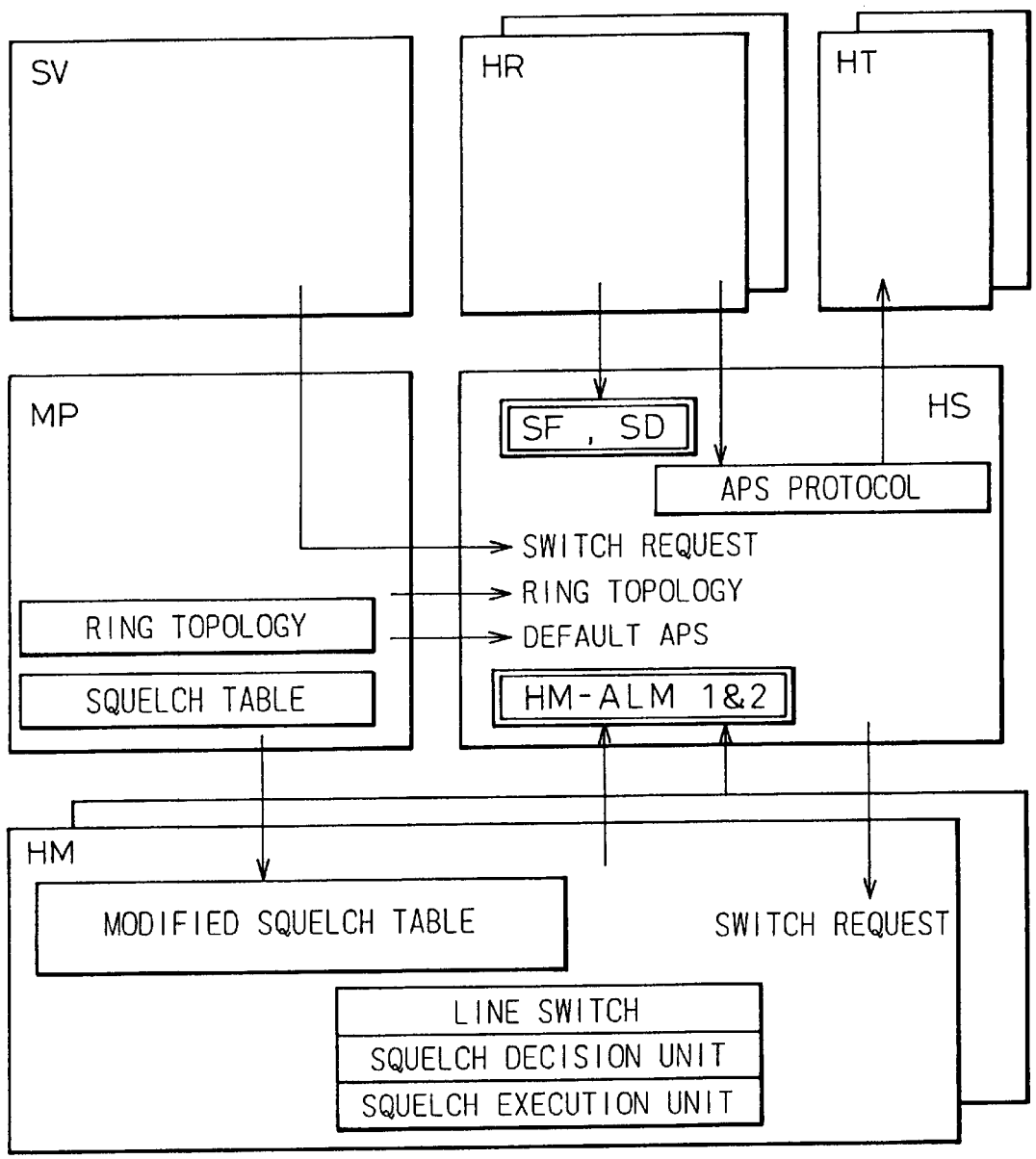
FIG. 7 is a functional block diagram of the control of a node.

FIG. 7 is a functional block diagram of the control of each node and indicates the supervising unit SV, the controller unit MP, the switch handling unit HS, the main signal handling unit HM, the reception interface unit HR, and the transmission interface unit HT. The controller unit MP builds the ring topology by the means as explained referring to FIGS. 1A to 1C and creates the squelch table by the means as explained referring to FIGS. 2A to 2B and FIGS. 3A to 3B. Further, the main signal handling unit HM includes the line switch, squelch decision unit, squelch execution unit, and the modified squelch table. The line switch carries out the switching according to the switch request of the switch handling unit HS.

The controller unit MP manages the ring topology and the squelch table, requests a default automatic protection switch (APS) protocol to the switch handling unit HS when the ring topology has not been built, and transfers the built ring topology to the switch handling unit HS. Further, the requests from the supervising unit SV such as for compulsory switching, manual switching, and test switching are sent to the switch handling unit HS.

The switch handling unit HS supervises the reception signal at the reception interface unit HR. When detecting a transmission line failure SF or signal degradation SD or when detecting two-side (WK and PT) failures HM-ALM1&2 where the main signal handling units HM of the two sides are removed, it executes an automatic protection switch (APS) protocol by using them as the switching trigger and transmits the switch request by the result of this to the main signal handling unit HM. Further, in the case of two-side failure of the main signal handling unit HM, the status of the sixth to eighth bits in the K2 byte is notified to the other node as "100".

The main signal handling unit HM refers to the modified squelch table created based on the squelch table in the controller unit MP by the switch request from the switch handling unit HS, while the squelch decision unit decides whether or not the squelch operation is necessary and executes a squelch operation for inserting the P-AIS into the predetermined channel by the squelch execution unit. Further, the main signal handling unit HM performs the switching by the line switch and notifies the result of squelch decision and the result of squelch execution to the controller unit MP. Note that, at the occurrence of a failure, the updating of the squelch table is prohibited, accordingly there is no guarantee of coincidence of the relationship between the content of the squelch table and the time slot assignment. Therefore, the squelch operation is also carried out with respect to the unused lines (UNEQ). That squelch operation is not notified to the controller unit MP. Further, the squelch operation is not carried out for a node which is isolated by the failure of both of the East side and West side, in the case of a single failure, or when the home node is not a switching node.

FIGS. 8A to 8F are explanatory views of the squelch decision. FIG. 8A shows a system wherein six nodes (A) to (F) to which the node identification numbers IDs similar to those of the system shown in FIG. 4 are assigned are connected by ring transmission lines. When a signal is transmitted and received between the nodes (D) and (F), if failures occur between the nodes (A) and (F) and between the nodes (D) and (E), the node (D) forms a loopback on the East side upon detecting a transmission line failure SF. The ring topology [D] in this case is "7, 1, 3, 5, 11, 9" as shown in FIG. 8B. The modified squelch table in the case where the signal is transmitted and received with the node (F) is the modified node ID=2 of the node (F) of the node ID=3. Therefore, as shown in FIG. 8C, the E→W direction and E←W direction on the East side become "2, 0". Namely, this means that a path between 2[F] and 0[D] is formed.

By the execution of the automatic protection switch (APS) protocol in the switch handling unit HS (refer to FIG. 7), the node which the signal can reach, that is, the node (A) of the far end node ID=5 can be discriminated, therefore the ID of this node (A) is translated to the modified node ID=3 and notified to the main signal handling unit HM. Namely, as shown in FIG. 8D, the modified far end node ID (FEID=3 [A]) of the node (A) represented by "0011", the node status ST representing the East side switch represented by "10", the bridge state Br represented by "1", and the switch state Sw represented by "1" are notified. Note that, a node status ST of "00" means the idle state, of "01" means the pass through state, "10" means the East side switching state, and "11" means the West side switching state. Further, the far end node ID in the case of a single failure is made "000" indicating the home node.

As mentioned before, the node (D) does not receive the signal from the East side due to the East side failure. Namely, in the ring topology [D] shown in FIG. 8E, the signals from the nodes of the modified node IDs of 1 or more do not reach the node (D). Further, the far end node (A) on the West side is the node of the limit for receiving the signal from the West side. Namely, in the ring topology [D] shown in FIG. 8F, the signals from the nodes of the modified node IDs of 2 or less do not reach the node (D). Accordingly, in the ring topology [D] shown in FIG. 8B, it is seen that the nodes which the signals cannot reach are the nodes of the modified node IDs of 1 and 2.

In this case, it is seen that the signal does not reach the nodes having the modified node IDs of 2 or less, therefore by referring to the modified squelch table, when there is a node receiving no signals, that is, when there is a modified node ID of 2 or less, it can be decided that the squelch operation is necessary. Therefore, in the modified squelch table shown in FIG. 8C, there is a modified node ID of 2 or less, so a squelch operation will be executed with respect to this channel.

FIGS. 9A to 9F are explanatory views of the squelch decision, and FIG. 9A shows the same system as that of FIG. 8A. Further, the ring topology [E] in the node (E) becomes "1, 3, 5, 11, 9, 7" as shown in FIG. 9B. Communication between the modified node IDs of 1 and 5 is carried out between the nodes (F) and (D). Therefore, this means that a path between 1[F] and 5[D] is formed. Accordingly, as shown in FIG. 9C, the modified squelch table [E] becomes "1, 5" for the West side.

Further, by the execution of the automatic protection switch (APS) protocol due to the failures between the nodes (A) and (F) and between the nodes (E) and (D), as shown in FIG. 9D, "0001" (FEID=1[F]) obtained by translating the ID of the far end node (F) to the modified node ID, the node status ST of "11" indicating the West side switch state, the bridge state Br of "1", and the switch state Sw of "1" are notified from the switch handling unit HS to the main signal handling unit HM.

Further, since it is a West side failure, in the ring topology [E] shown in FIG. 9E, no signal is received from the West side (right side). Further, in the ring topology [E] shown in FIG. 9F, the far end node is the node (F), and no signal reaches the nodes of the modified node IDs of the values exceeding this modified node ID of 1. Accordingly, as shown in the ring topology [E] of FIG. 9B, it is seen that the signal does not reach the nodes having the modified node IDs equal to 2 or more, therefore if there are two or more modified node IDs in the modified squelch table [E], it is decided that a squelch operation is necessary. In this case, since there is the node (D) of the modified node ID=5, the squelch operation will be carried out for that channel.

Figure 10:
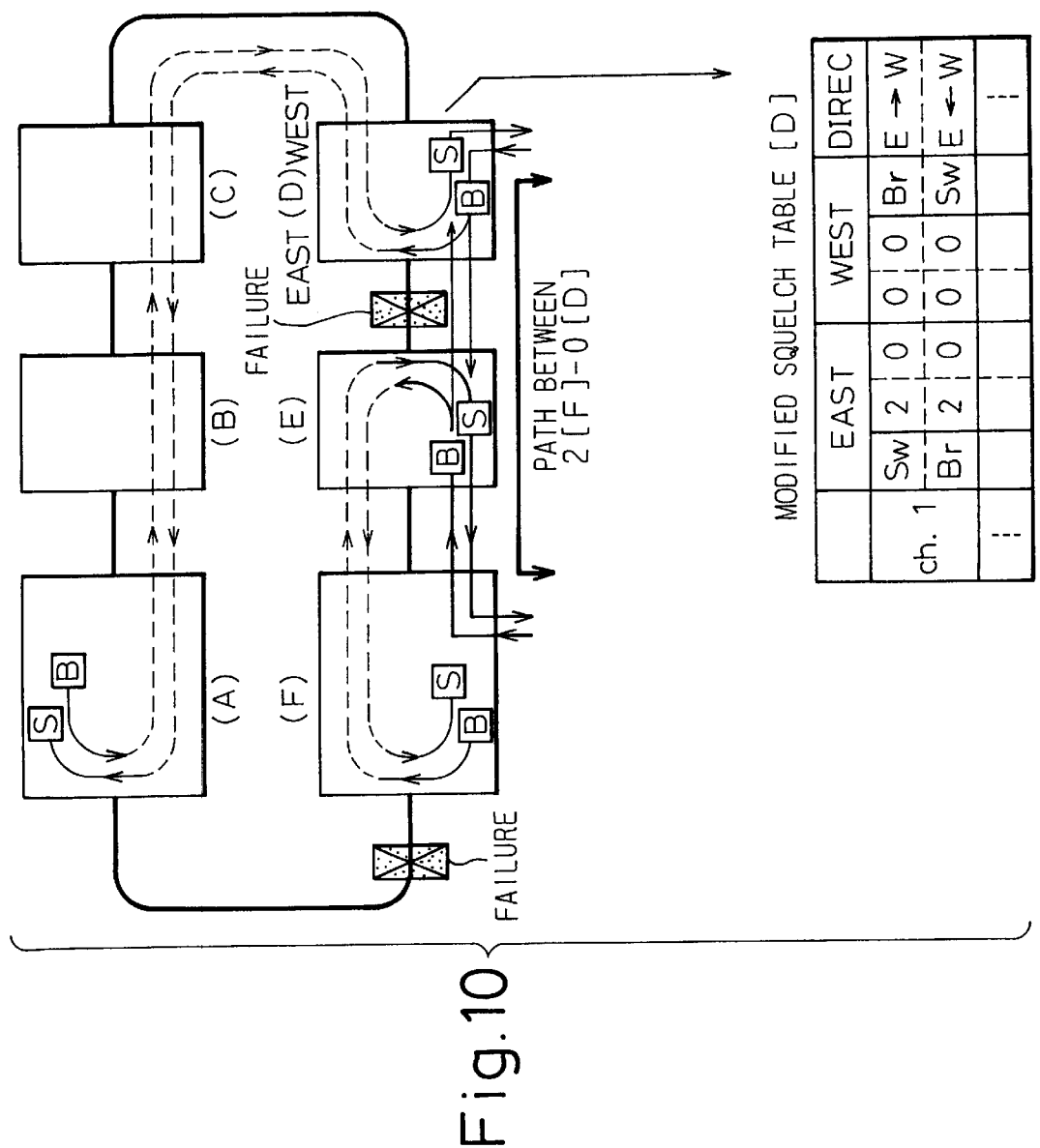
FIG. 10 is an explanatory view of squelch processing.

FIG. 10 is an explanatory view of the squelch processing and shows the squelch processing in the same state as FIG. 8A, in which S denotes a switch side squelch, B a bridge side squelch, and dotted lines denote protection lines. The nodes (A), (D), (E), and (F) detect the transmission line failures SF and therefore become the switching nodes.

Further, the figure shows, for the node (D), the transmission direction DIREC of for example the channel ch.1 in the modified squelch table [D] thereof. The transmission node in the E→W direction on the East side is the node (F) having the modified node ID=2, the reception node is the home node (D), the transmission node of the E←W direction is the home node (D), and the reception node is the node (F) having the modified node ID=2. Due to a failure on the East side, the switch Sw is formed in the E→W direction, the bridge Br is formed in the E→W direction, the bridge Br is formed in the E←W direction on West side, and the switch Sw is formed in the E→W direction.

For example, the node (D) refers to the modified squelch table [D] and carries out a squelch operation since the signal does not reach the node (F) having the modified node ID=2 of the channel ch.1. Further, the node (E), similarly, refers to the modified squelch table and carries out a squelch operation for the channel ch.1 for the node (D) receiving no signals.

Figure 11:
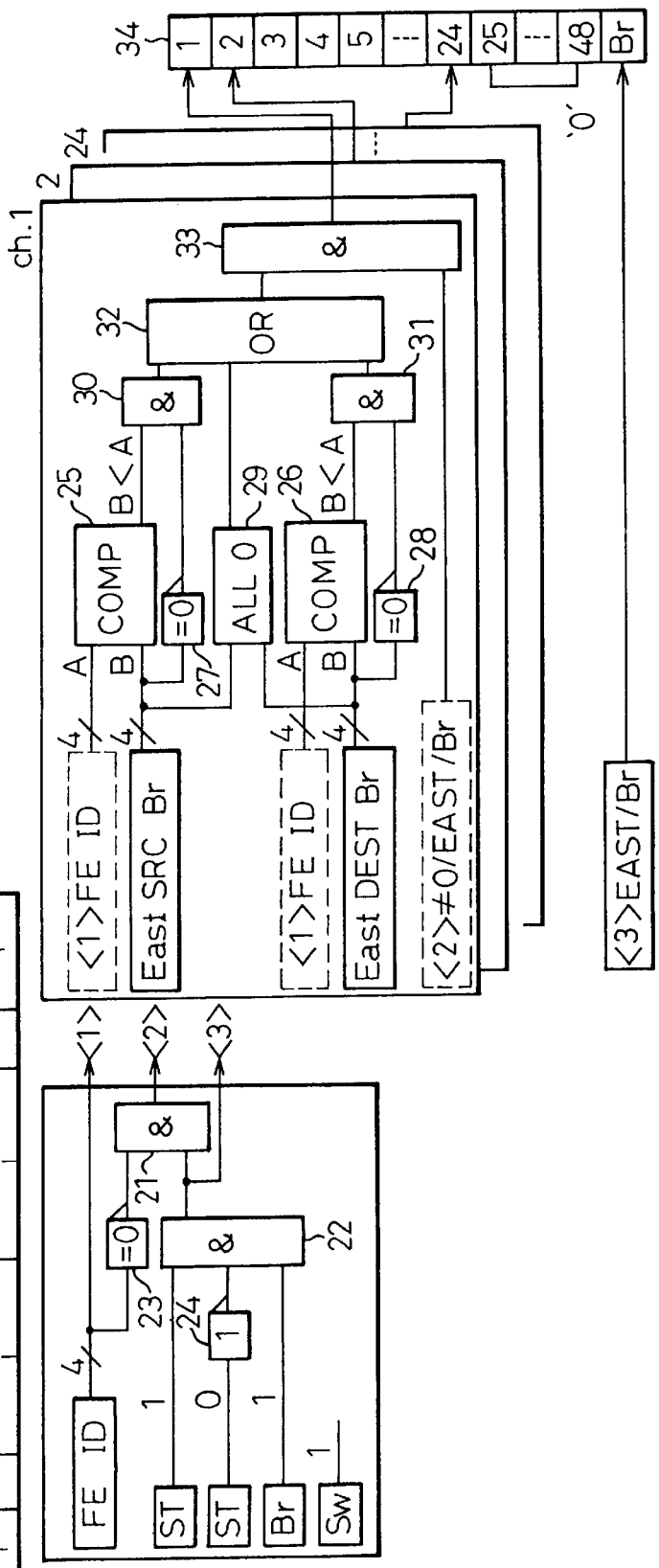
FIG. 11 is an explanatory view of an east side squelch decision unit (first)
Figure 12:
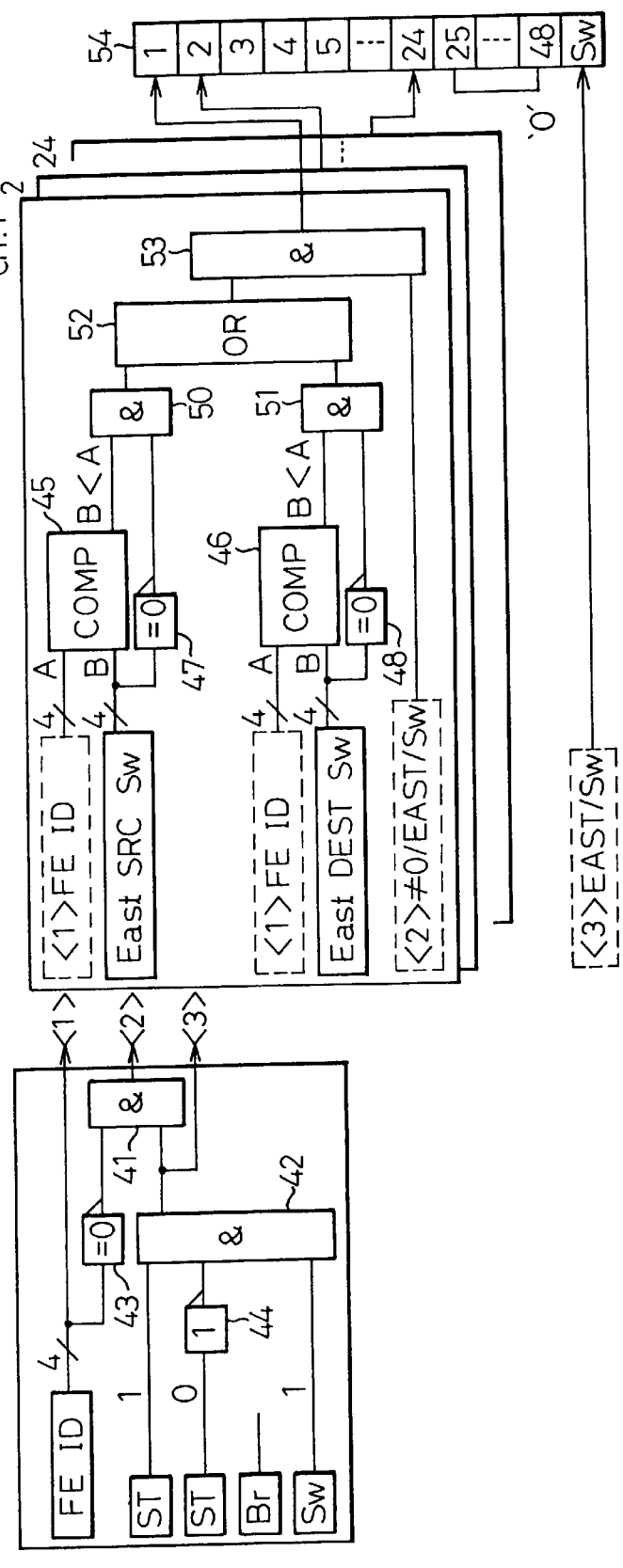
FIG. 12 is an explanatory view of an east side squelch decision unit (second)

FIG. 11 and FIG. 12 are explanatory views of the East side squelch decision unit, in which FIG. 11 shows for example the case of the bridge on the East side in the node (E), and FIG. 12 shows the case of the switch on the East side, respectively. Reference numerals 21, 22, 41, and 42 are AND circuits (&), 23 and 43 are gate circuits outputting "1" when FEID is not equal to 0, and 24 and 44 are inverters. These constitute a channel common part.

Further, 25, 26, 45, and 46 are comparators (COMP), 27, 28, 47, and 48 are gate circuits outputting "1" when the modified node ID of the transmission node or the reception node is not 0, 29 is a gate circuit (ALL0) outputting "1" when both of the modified node IDs of the transmission node and the reception node are 0 (home nodes), 30, 31, 33, 50, 51, and 53 are AND circuits (&), 32 and 52 are OR circuits (OR), and 34 and 35 are registers. These constitute a channel corresponding part. Further, the channels ch.1 to ch.24 are defined as the working lines, and the channels ch.25 to ch.48 are defined as the protection lines.

Further, in the case of the far end node ID=4 based on the ring topology [E] by using the modified node ID, the control information from the switch handling unit HS to the main signal handling unit HM becomes "01001011". Namely, the FEID (far end modified node ID number) becomes "0100", the node status ST indicating the East side switch becomes "10", the BR indicating the bridge state becomes "1", and the Sw indicating the switch state becomes "1".

Further, in the modified squelch table [E], as mentioned before, corresponding to the East side of the node (E), West side, and the transmission directions DIREC (E→W, E←W), respectively, are stored the transmission node SRC (source node) and the reception node DEST (destination node) represented by the switch state Sw, the bridge state Br, and the modified node ID.

In the channel common part in FIG. 11, the far end node ID (FEID) is output as <1>, the "1" of the start in the node status ST "10" is input to the AND circuit 22, and the "0" next to this is inverted to "1" by the gate circuit 23 and input to the AND circuit 21. Further, the "1" representing the bridge state Br is input to the AND circuit 21. The output <3> in this case becomes "1" and indicates the east bridge EAST/Br. Further, the output of the gate circuit 23 becomes "1" since FEID is not equal to 0, and the output <2> of the AND circuit 21 becomes "1". Further, to the AND circuit 42 of the channel common part in FIG. 12 is input the switch state Sw of "1". The outputs <1> to <3> of this case become the same as the outputs <1> to <3> from the channel common part of FIG. 11.

Further, in the channel corresponding part, the comparators 25 and 45 compare the FEID and the modified node IDs (East SRC Br, East SRC Sw) representing the transmission nodes on East side, and the comparators 26 and 46 compare the FEID and the modified node IDs (East DEST Br, East DEST Sw) representing the reception nodes on the East side. Where B<A, the output is made "1". Namely, "1" is output in the case of a modified node ID smaller than the FEID.

Further, when the modified node ID representing the transmission node and the reception node is not 0, that is, when it does not indicate the home node, the outputs of the gate circuits 27, 28, 47, and 48 become "1". If the outputs of the comparators 25, 26, 45, and 46 are "1", the outputs of the AND circuits 30, 31, 50, and 51 become "1" and are respectively input to the AND circuits 33 and 53 via the OR circuits 32 and 52, while when the outputs <2> of the AND circuits 21 and 41 of the channel common part are "1", the outputs of the AND circuits 33 and 53 become "1" and are respectively set in the registers 34 and 54, to indicate the channel for which performance of a squelch operation has been decided. Further, where both of the modified node IDs representing the transmission node and the reception node are 0, the output of the gate circuit 29 becomes "1". In this case, an unused line is indicated, therefore the output of "1" of the AND circuit 33 is set in the register 34 in this channel corresponding part and performance of a squelch operation on the unused channel is decided.

Figure 13:
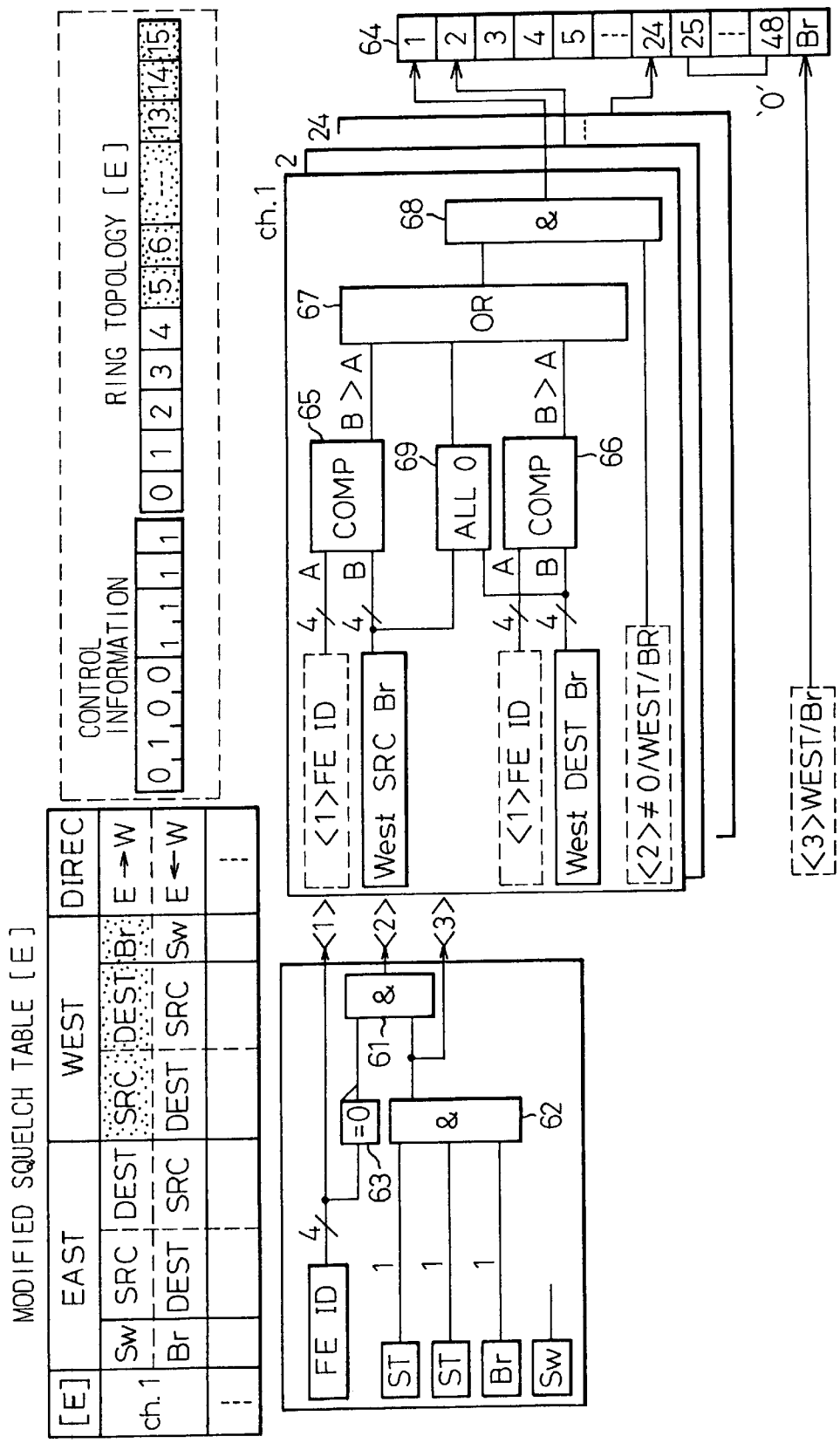
FIG. 13 is an explanatory view of a west side squelch decision unit (first)
Figure 14:
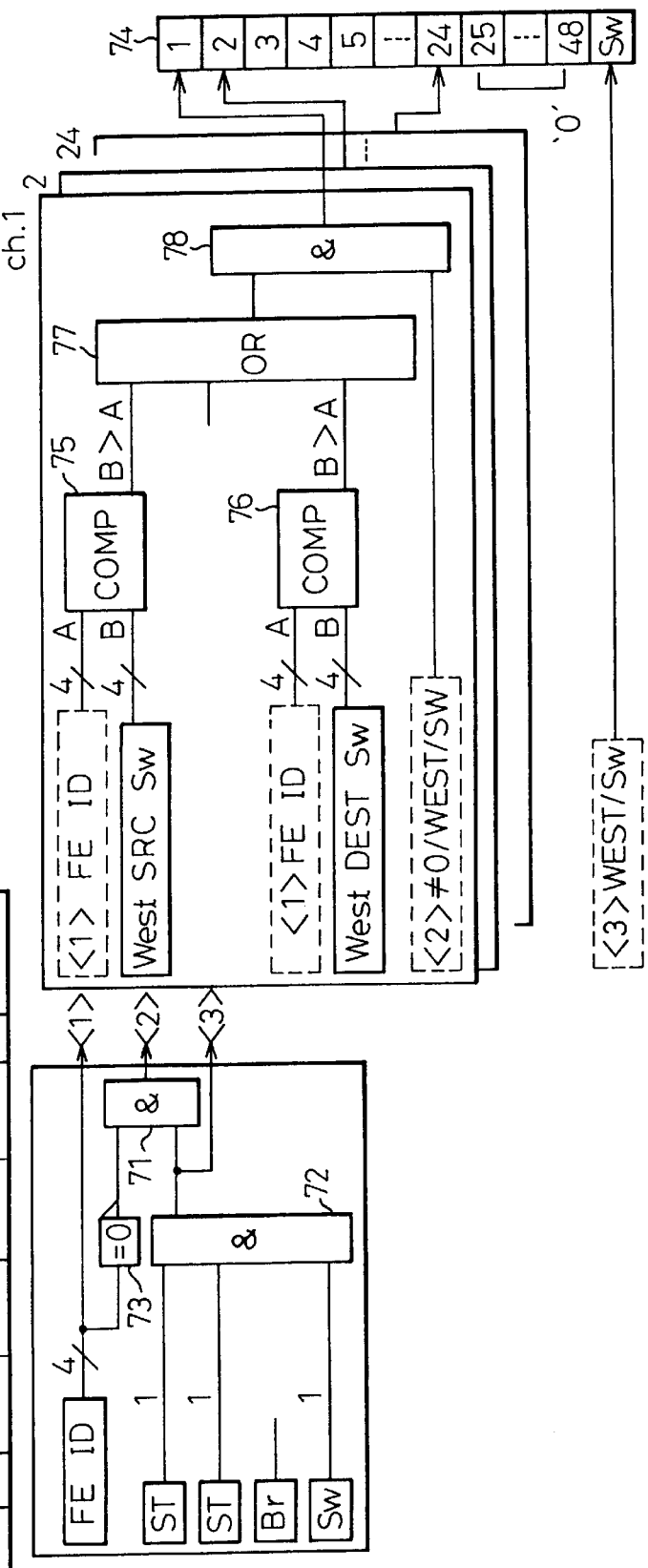
FIG. 14 is an explanatory view of a west side squelch decision unit (second)

FIG. 13 and FIG. 14 are explanatory views of the West side squelch decision unit, in which FIG. 13 shows for example the case of the bridge on the West side in the node (E), and FIG. 14 shows the case of the switch on the West side thereof, 61, 62, 71, and 72 are AND circuits (&), and 63 and 73 are gate circuits outputting "1" when FEID is not equal to 0. These comprise the channel common part.

Further, 64 and 74 are registers indicating channels for which performance of the squelch operation has been determined. Further, 65, 66, 75, and 76 are comparators (COMP), 67 and 77 are OR circuits (OR), 68 and 78 are AND circuits (&), and 69 is a gate circuit (ALL0) outputting "1" when both of the modified node IDs representing the transmission node and the reception node are 0. These comprise the channel corresponding part.

Further, in the case of the far end node ID=4 according to the ring topology [E] using the modified node IDs, the control information from the switch handling unit HS to the main signal handling unit HM becomes "01001111". Namely, the FEID (far end modified node ID number) becomes "0100", the node status ST indicating the switch at the West side becomes "11", the Br indicating the bridge state becomes "1", and the Sw indicating the switch state becomes "1".

The output <1> from the channel common part in this case is FEID, and both of outputs <2> and <3> become "1". Further, the comparators 65, 66, 75, and 76 in the channel corresponding part make the output "1" when there is a transmission node or reception node having a modified node ID representing a value larger than FEID conversely to the comparators of the channel corresponding parts of FIG. 11 and FIG. 12. Further, when the output <2> from the channel common part is "1", if the outputs from the comparators 65, 66, 75, and 76 are "1", the outputs from the AND circuits 68 and 78 become "1". They are set in the registers 64 and 74 to indicate the channels for which performance of a squelch operation has been determined. Further, the gate circuit 69 discriminates the unused lines on the bridge side and it is indicated to carry out a squelch operation.

Figure 15:
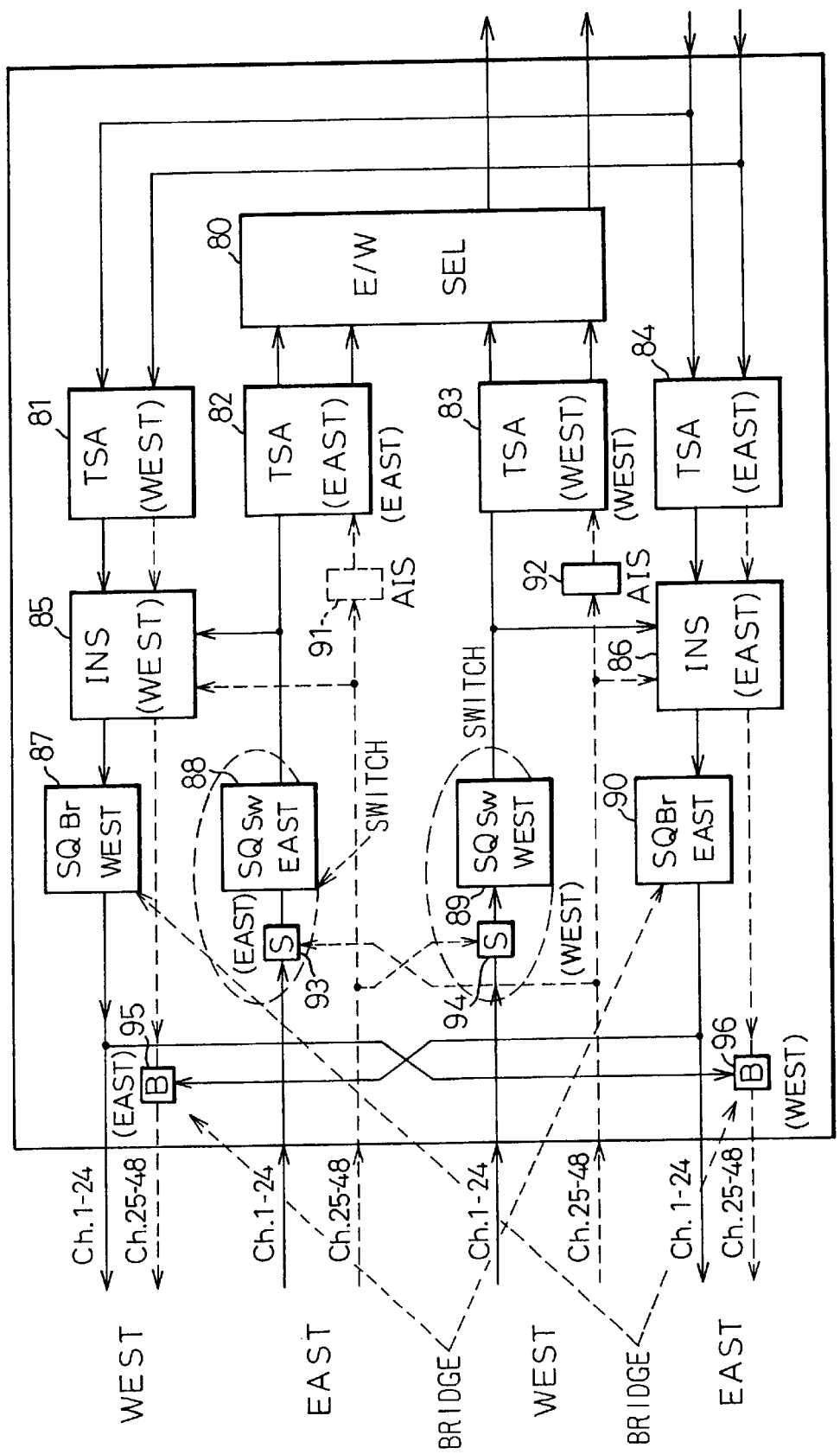
FIG. 15 is an explanatory view of a squelch insertion point.

FIG. 15 is an explanatory view of a squelch insertion point and indicates the principal parts of the time slot assignment unit of the main signal handling unit HM. In the figure, (WEST) denotes the West side, (EAST) denotes the East side, 80 denotes a selector (E/WSEL), 81 to 84 denote the West side or East side time slot assignment units (TSA), 85 and 86 denote insertion units (INS), 87 to 90 denote squelch units ($SQ_{Br}$, $SQ_{Sw}$), 91 and 92 denote AIS units, 93 and 94 denote switch units (S), and 95 and 96 denote bridge units (B). Further, the solid lines denote the working lines (ch.1 to ch.24), and dotted lines denote the protection lines (ch.25 to ch.48).

The signal dropped by the East side or West side time slot assignment units 82 and 83 via the selector 80 (E/W SEL) is transmitted from the selector 80, and the signal to be added is input to the East side and West side time slot assignment units 81 and 84. Further, for example the West side bridge of the node is formed by the bridge unit 96. The bridge squelch in this case is executed by insertion of P-AIS at the squelch unit 87. Further, the East side switch is formed by the switch unit 93. The switch squelch in this case is executed by the insertion of the P-AIS at the squelch unit 88.

Figure 16:
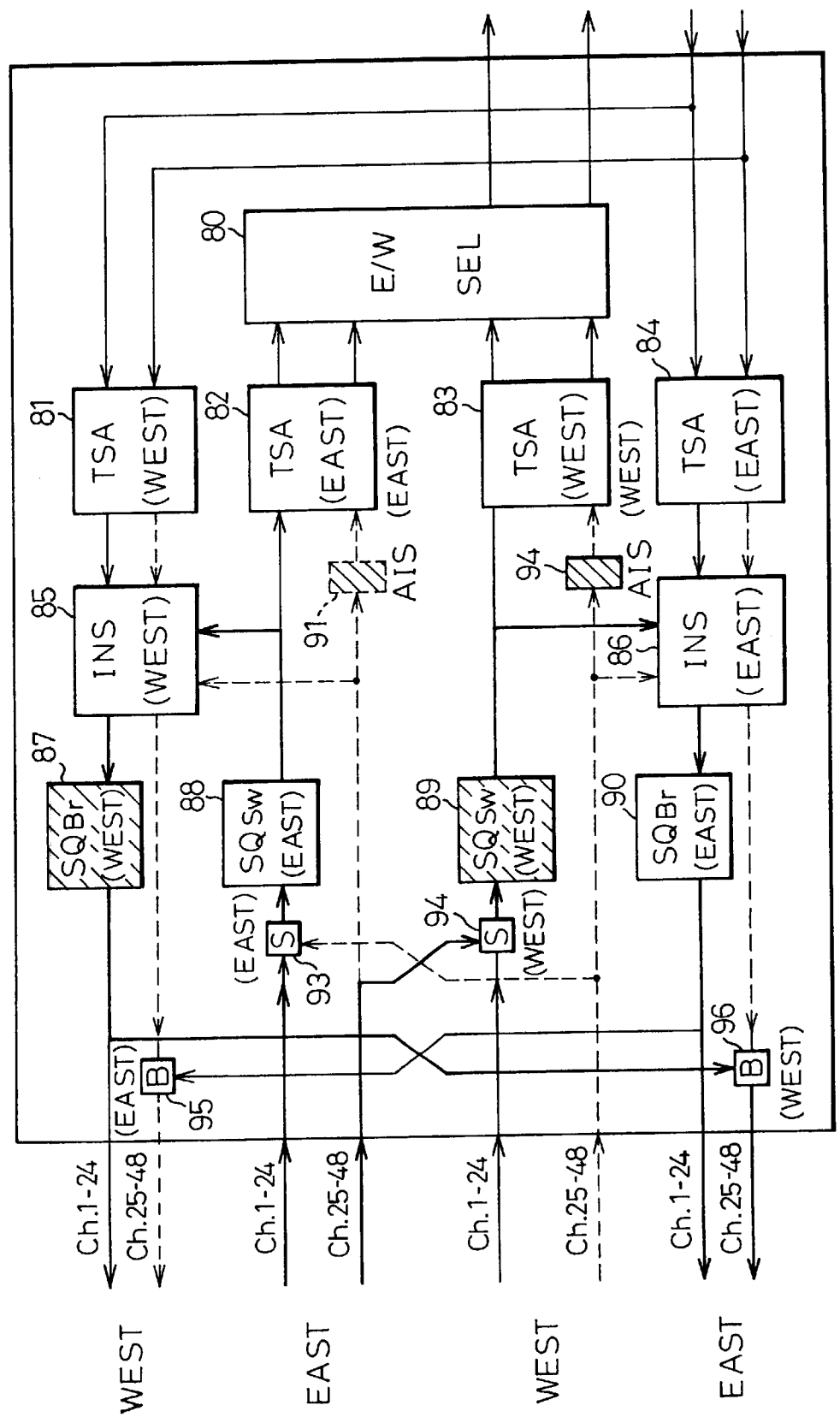
FIG. 16 is an explanatory view of a signal flow when loopback is formed at the east side.

FIG. 16 is an explanatory view of the signal flow when a loopback is formed at East side. In the figure, the same references as those in FIG. 15 indicate the same parts. The figure shows a case where a loopback is formed on the West side of the node due to the occurrence of a failure at the West side thereof. Namely, the channels ch.1 to ch.24 of the working lines at the receiving East side are looped back to the channels ch.25 to ch.48 of the protection lines at the transmitting East side by a route of 93→88→85→87→96 when indicated by numerals by the control of the insertion unit 85 and the bridge unit 96. The insertion of the P-AIS is performed for the channel for which performance of a squelch operation has been decided at the squelch unit 87 by the squelch decision.

Further, the channels ch.25 to ch.48 of the protection lines at the receiving East side are looped back to the channels ch.1 to ch.24 of the working lines at the transmitting East side by the route of 94→89→86→90 when indicated by numerals by the control of the switch unit 94 and the insertion unit 86. The insertion of the P-AIS is performed for the channel for which performance of a squelch operation has been decided at the squelch unit 89 by the squelch decision.

Figure 17:
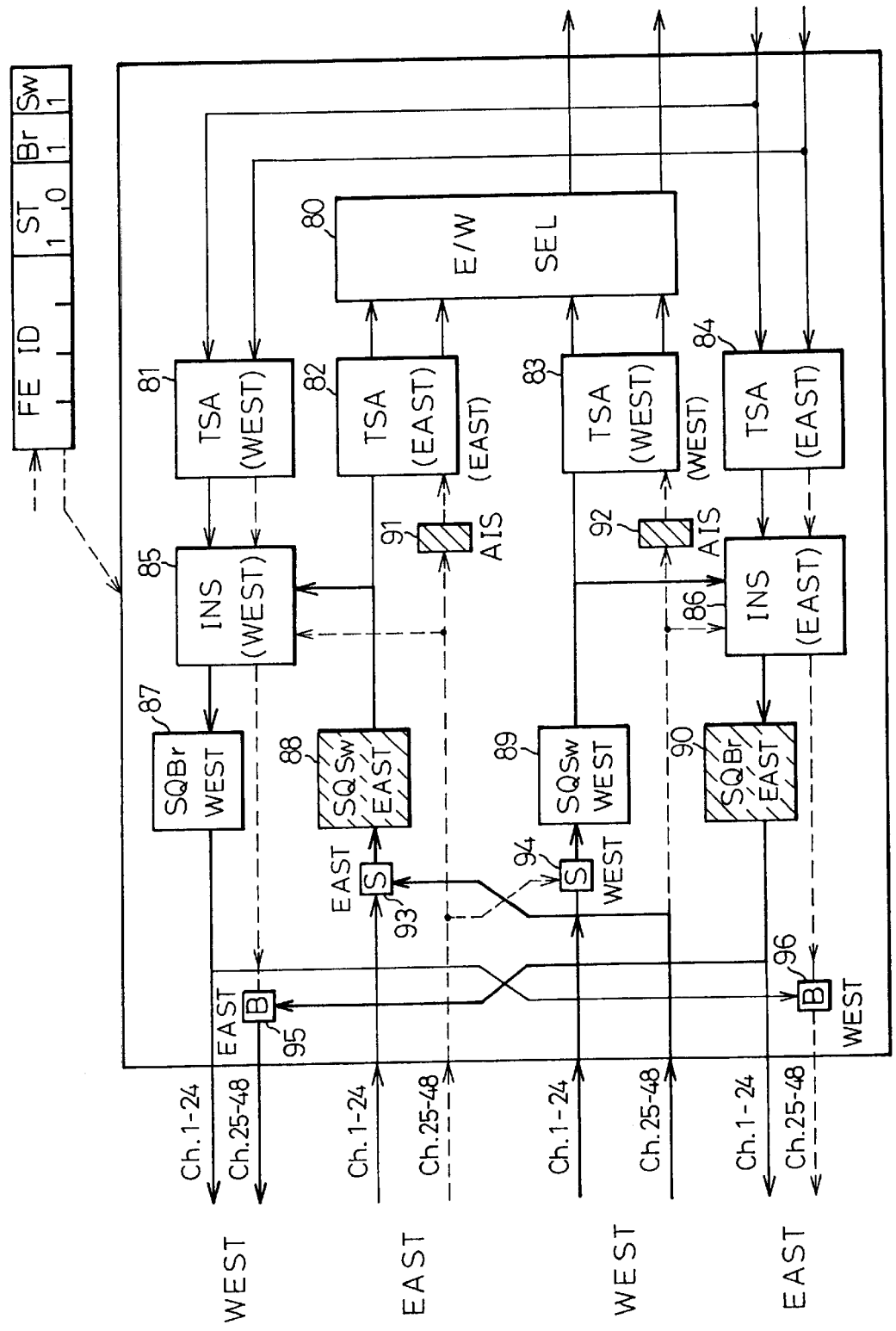
FIG. 17 is an explanatory view of a signal flow when loopback is formed at the west side.

FIG. 17 is an explanatory view of the signal flow when a loopback is formed at West side. In the figure, the same references as those in FIG. 15 indicate the same parts. The figure shows a case where a loopback is formed on the East side of the node due to the occurrence of a failure at the East side thereof. The control information comprised by the far end node ID (FEID), the node status ST="10" (East side switch), the bridge Br="1", and the switch Sw="1" are transferred from the switch handling unit HS to the main signal handling unit HM in this case. The channels ch.1 to ch.24 of the working lines at the receiving West side are looped back to the channels ch.25 to ch.48 of the protection lines at the transmitting West side by the route of 94→89→86→90→95 when indicated by numerals by the control of the insertion unit 86 and the bridge unit 95. The insertion of the P-AIS is performed for the channel for which performance of a squelch operation has been decided at the squelch unit 90.

Further, the channels ch.25 to ch.48 of the protection lines at the receiving West side are looped back to the channels ch.1 to ch.24 of the working lines at the transmitting West side by the route of 93→88→85→87 when indicated by numerals by the control of the switch unit 93 and the insertion unit 85, and the insertion of the P-AIS is performed to the channel determined to perform squelch operation at the squelch unit 88.

Figure 18A:
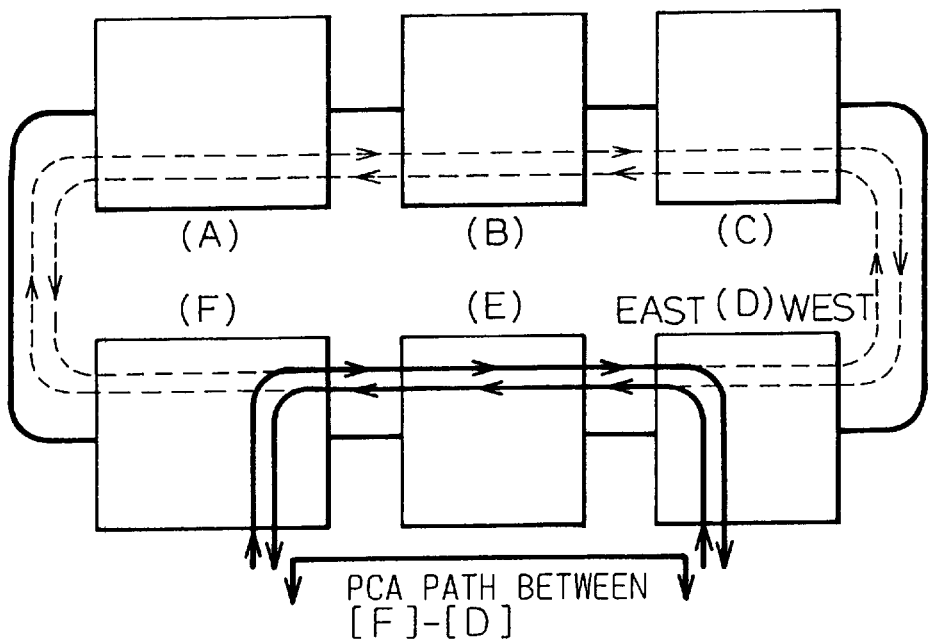
FIGS. 18A and 18B are explanatory views of the squelch processing for the protection line channels.
Figure 18B:
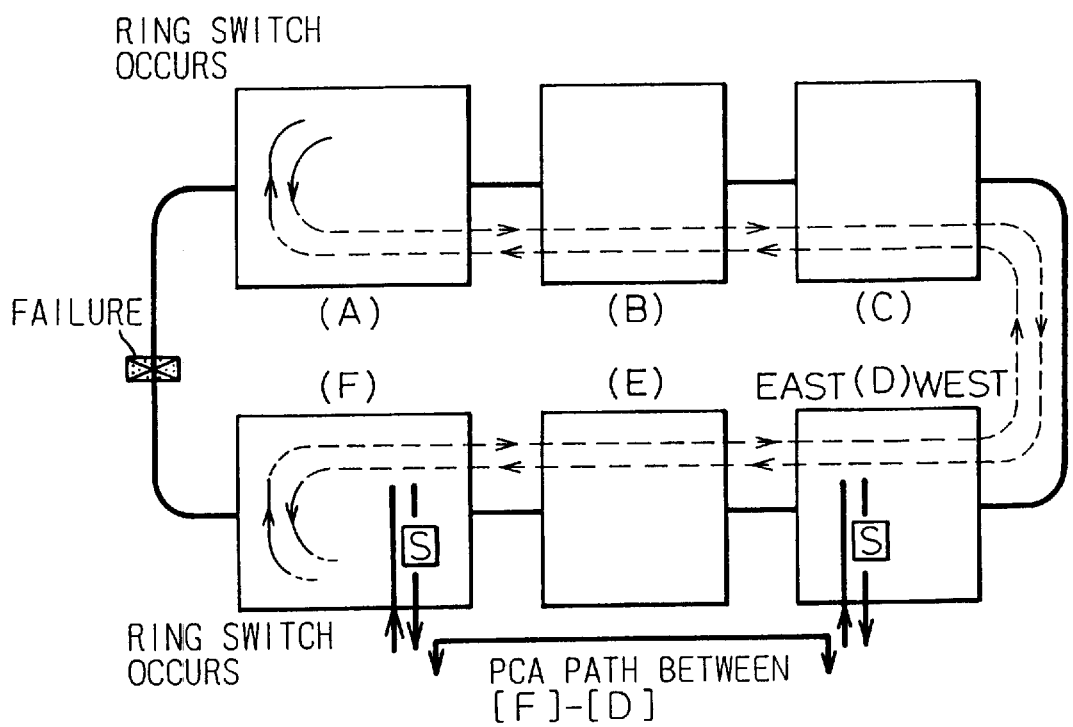

FIGS. 18A and 18B are explanatory views of the squelch processing with respect to the protection line channels. As shown in FIG. 18A, the nodes (A) to (F) are connected via the working lines of the solid lines and the protection lines of the dotted lines. Assume that a failure occurs between the nodes (A) and (F) as shown in FIG. 18B when the transmission and reception of the signal is carried out by the route of the solid arrow by the protection channel access (PCA) path between the nodes (F) and (D). The ring switch is generated in the nodes (A) and (F), respectively, and the protection lines will be used. At this time, the protection channel access (PCA) path between the nodes (F) and (D) becomes unable to be used. Accordingly, the insertion positions of signals into the protection line channels are all placed in the through state, and the squelch operation S for inserting the P-AIS is executed at the position where the signals are dropped from the protection line channels. Namely, at the pass through node, all of the protection line channels are placed in the through state, and the signal add is stopped, while the insertion of the P-AIS is carried out to the signal drop channel.

Figure 19A:
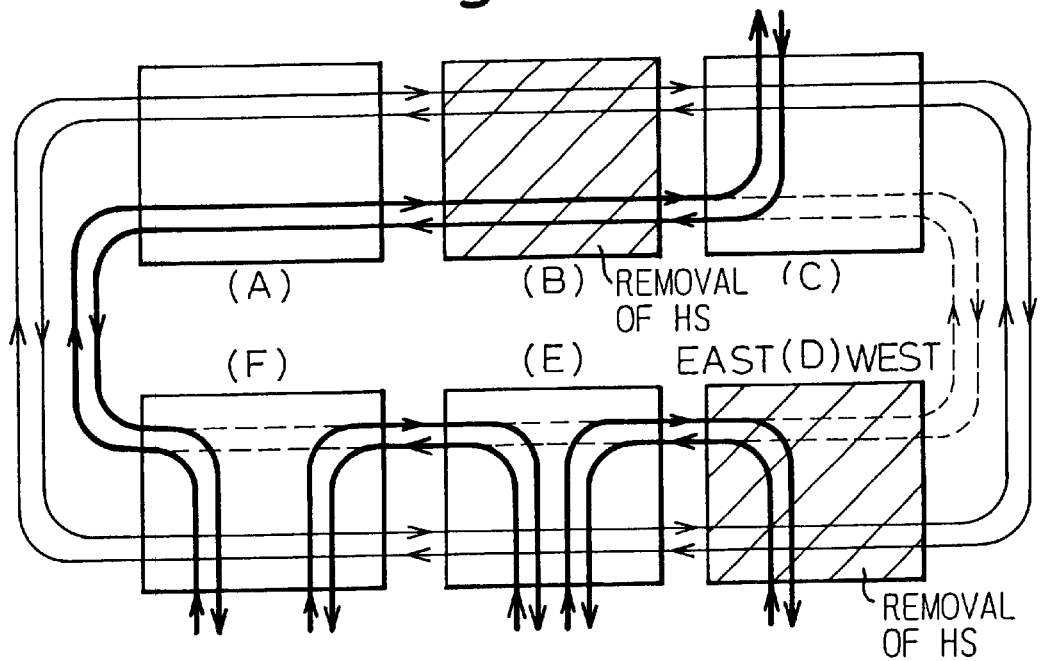
FIGS. 19A and 19B are explanatory views of the squelch processing at a switching node.
Figure 19B:
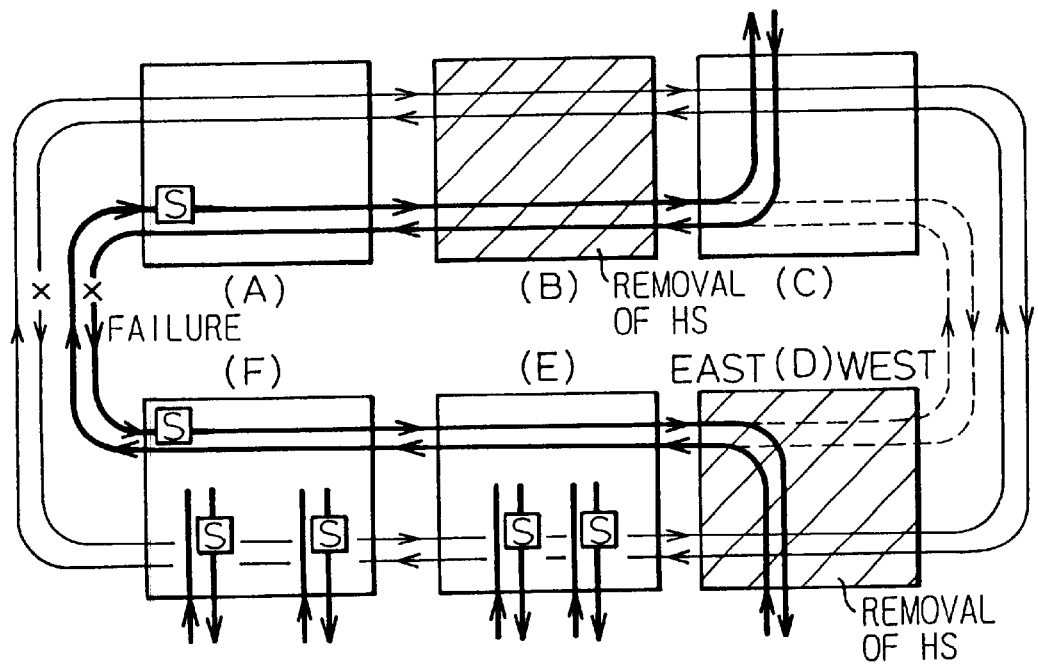

FIGS. 19A and 19B are explanatory views of the squelch processing in the switching node. As shown in FIG. 19A, the nodes (A) to (F) are connected by the ring transmission lines (working lines represented by the thin lines in the diagram and the protection lines represented by the dotted lines). In the nodes (B) and (D), in a state where the switch handling unit HS is removed, when the communication is carried out by forming the protection channel access (PCA) paths as indicated by the wide lines between the nodes (C) and (F), between the nodes (F) and (E), and between the nodes (E) and (D), it is assumed that a failure has occurred in the working line of the thin line going from the node (A) to the node (F) and in the protection channel access (PCA) path of the wide line as shown in FIG. 19B. In this case, the squelch operation is executed at the point S. Namely, the nodes (F) and (E) place the protection line channels into the through state and start the squelch operation for inserting the P-AIS into the channels dropped from the protection lines.

Further, the automatic protection switch (APS) code from the node (A) does not travel to the nodes (C) and (D) if the switch handling unit HS of the node (B) is removed, therefore the nodes (C) and (D) maintain the normal mode state. In order to notify such nodes (C) and (D) that the protection lines cannot be used, a squelch operation is performed for inserting the P-AIS into the channels of the protection lines incoming from the position of failure in the nodes (A) and (F) which have become the switching nodes. The channels of the protection lines outgoing to the positions of failure are placed in the through state. Alternatively, a squelch operation is performed for inserting the P-AIS into the channels of the protection lines as well outgoing to the position of failure.

Figure 20:
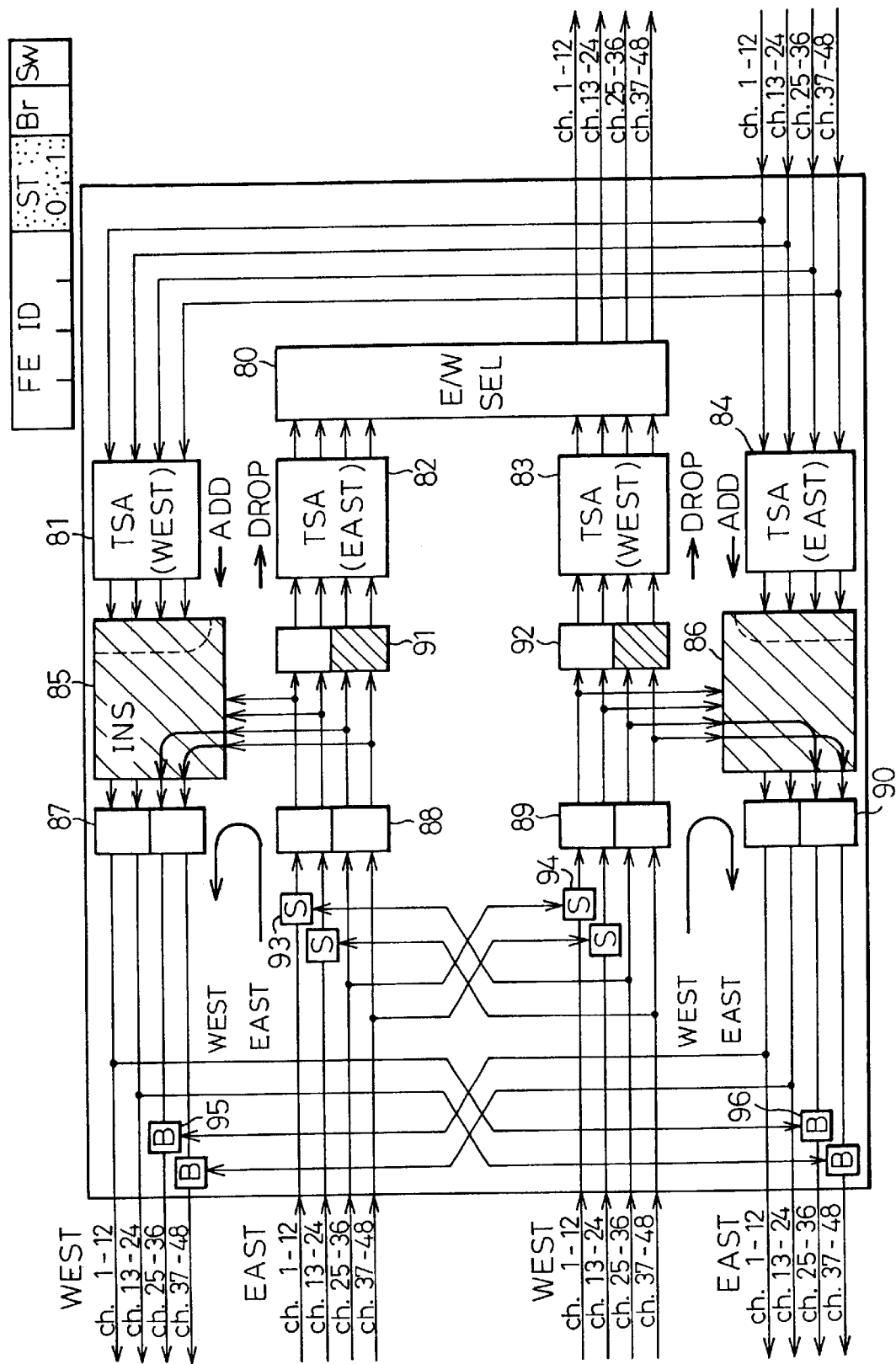
FIG. 20 is an explanatory view of the squelch processing for the protection line channels.

FIG. 20 is an explanatory view of the squelch processing with respect to the protection line channels. In the figure, the same references as those in FIG. 15 indicate the same parts. The node status ST in the control information from the switch handling unit HS to the main signal handling unit HM is "01", which indicates the pass through state. Namely, the protection line channels ch.25 to ch.48 at the East side are connected to the protection line channels ch.25 to ch.48 at the West side by the insertion unit 85. Further, the protection line channels ch.25 to ch.48 at the West side are connected to the protection line channels ch.25 to ch.48 at the East side by the insertion unit 86. In this case, the AIS is inserted, from the alarm indication signal units 91 and 92 before performing the time slot assignment, into all channels to be dropped from the protection line channels via the time slot assignment units 82 and 83 and the selector 80.

Figure 21:
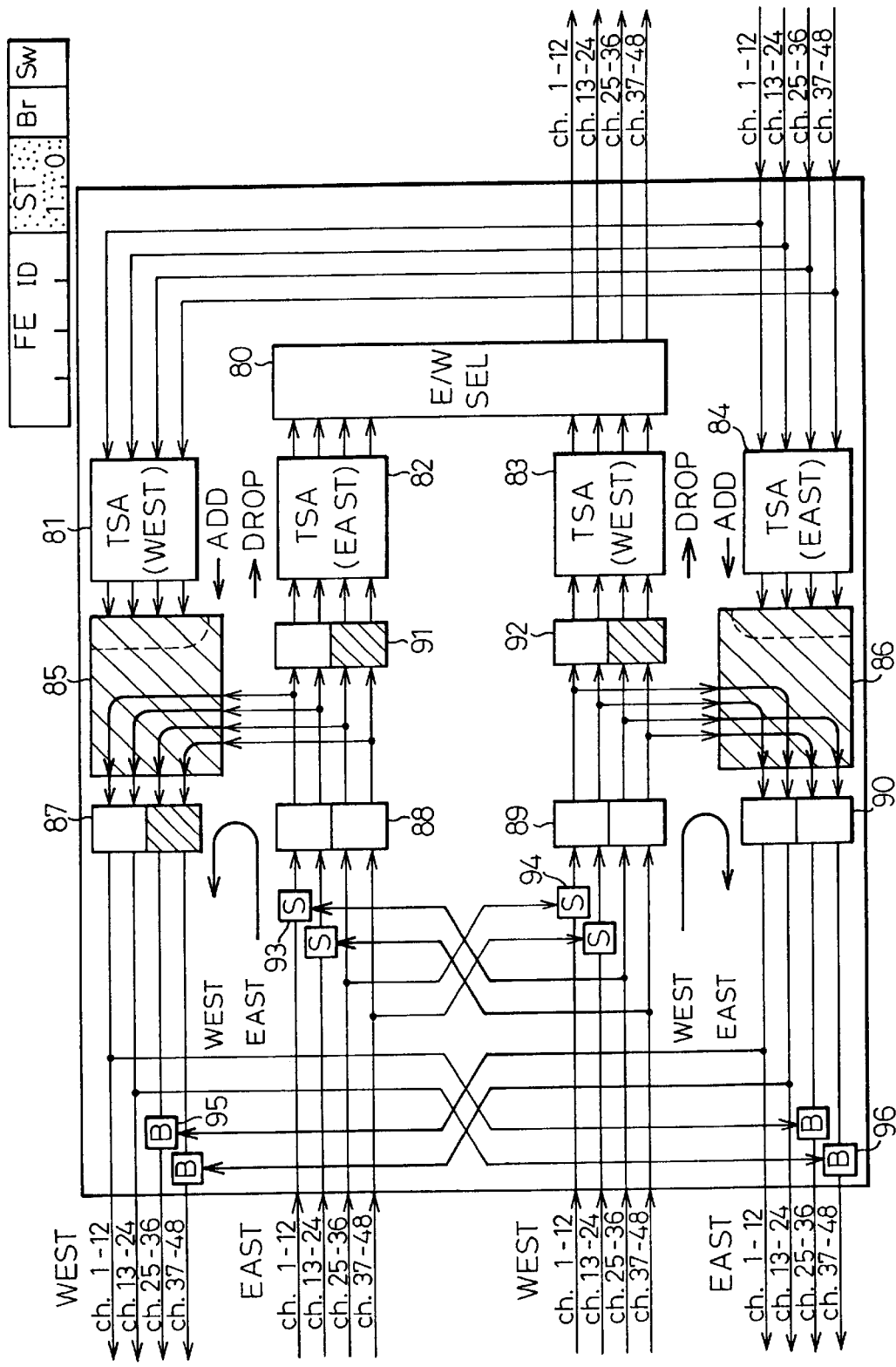
FIG. 21 is an explanatory view of the squelch processing for the protection line channels.

FIG. 21 is an explanatory view of the squelch processing with respect to the protection line channels. In the figure, the same references as those in FIG. 15 indicate the same parts. The node status ST in the control information from the switch handling unit HS to the main signal handling unit HM is "10", which indicates the state of the East switch (failure). Namely, the signals through the protection line channels ch.25 to ch.48 from the West side are transmitted through the working line channels ch.1 to ch.24 to the West side via the switch unit 93, the squelch unit 88, the insertion unit 85, and the squelch unit 87. Then, the squelch operation is executed by inserting the P-AIS into the protection line channels ch.25 to ch.48 to the West side, from the squelch unit 87.

Further, signals in the working line channels ch.1 to ch.24 from the West side are transmitted via the protection line channels ch.25 to ch.48 to the West side by the route of 94→89→86→90→95 when indicated only by numerals. Further, the AIS is inserted, from the alarm indication signal units 91 and 92 before performing the time slot assignment, into all channels to be dropped, via the time slot assignment units 82 and 83 and the selector 80, from the protection line channels ch.25 to ch.48 at the East side and West side.

Figure 22:
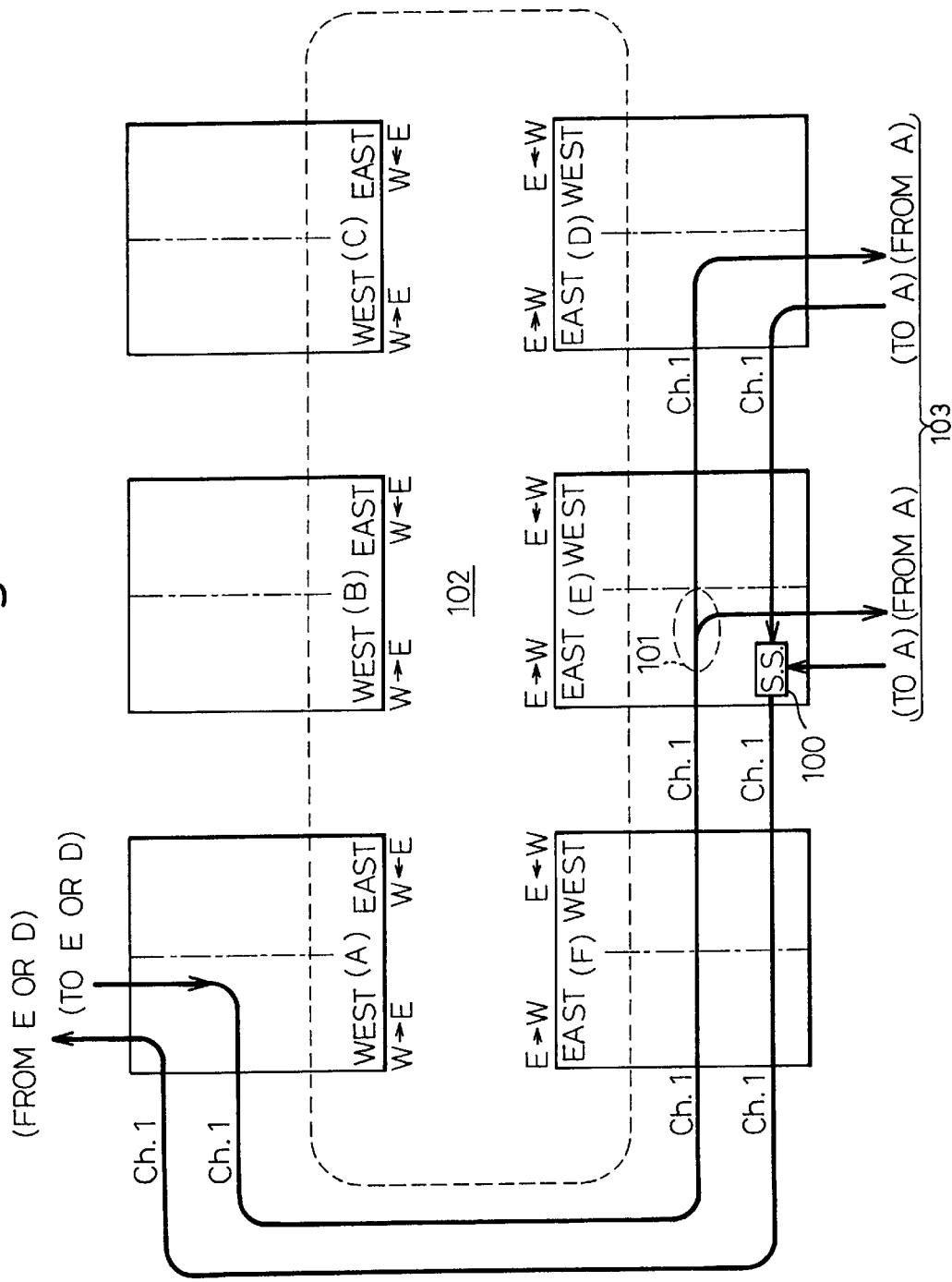
FIG. 22 is an explanatory view of the time when a service selector is activated.

FIG. 22 is an explanatory view of the time when the service selector is activated. Reference numeral 100 is a service selector (SS), and 101 is a drop and continue unit. Where one transmission system 102 to which the nodes (A) to (F) are connected through the ring transmission line and another transmission system 103 similar to this are connected via for example the nodes (D) and (E) and the signal is transmitted and received between the node (A) and the node (not illustrated) of the other transmission system 103 by the channel ch.1, the signal from the node (A) is dropped by the drop and continue unit 101 of the node (E) and, at the same time, transmitted to the node (D). Further, the normal signal, either the signal received from the other transmission system 103 at the node (D) or the signal received from the other transmission system 103 at the node (E) is selected by the service selector 100 of the node (E) and transmitted. Thus, the two transmission systems 102 and 103 are connected by a duplexed transmission line.

FIG. 23 and FIG. 24 are explanatory views of the squelch tables when the service selector is activated. They indicate the squelch tables [A] to [F] and ring topologies [A] to [F] corresponding to the nodes (A) to (F), respectively. Note that, 0 to 5 indicated in the lower portion of the ring topologies [A] to [F] indicate the above mentioned modified node IDs. For example, the ring topology [A] of the node (A) indicates the order of connection in the clockwise direction starting from the node (A) according to the connection configuration shown in FIG. 22. The modified node IDs are successively given in rising order starting from the node (A) as 0.

In the ring topologies [B] to [F] corresponding to the other nodes (B) to (F) as well, similarly the order of connection in the clockwise direction is indicated starting from the home node. The modified node IDs are given successively in a rising order from the home node as 0. Further, the squelch tables [A] to [F] create the modified squelch tables (illustration omitted) based on the modified node IDs.

Further, the squelch table [A] of the node (A) indicates that, as shown in FIG. 23, the transmission node of the E→W direction of the channel ch.1 at the West side is A, the reception node is D, the transmission node in the E←W direction is D, and the reception node is A. Further, the respective squelch tables [B] and [C] of the nodes (B) and (C) indicate the state (–) where the channel ch.1 is not used.

Further, the squelch table [F] in the node (F) shows the transmission node A and reception node D at East side in the E→W direction of the channel ch.1 and the transmission node A and the reception node D at the West side and, at the same time, shows the transmission node D and reception node A at the East side in the E←W direction and the transmission node D and the reception node A at the West side. Further, for the channel ch.1 of the squelch table [E] in the node (E), the same content as that of the channel ch.1 of the squelch table [F] in the node (F) is stored. Further, for the channel ch.1 of the squelch table [D] in the node (D), the transmission node A and the reception node D in the E→W direction on the East side and the transmission node D and the reception node A in the E←W direction are respectively stored.

In this case, the node (E) activates the service selector 100 whereby one signal to the node (A) from the two paths is selected. The signal from the node (A) is transmitted to the two paths by the drop and continue unit 101. In this case, the IDs are stored in the squelch table by defining the nodes in which the signals are finally dropped and added as the reception nodes and the transmission nodes, respectively.

For example, where a failure occurs in the channel ch.1 between the nodes (E) and (D), the AIS is inserted between the nodes (E) and (D), but the communication by the channel ch.1 between the node (A) and the other transmission system 103 can be continued via the node (E), therefore a squelch operation is not executed. Further, in the case of a multi-cast, a squelch table in which the node furthest from the transmission node is defined as the reception node will be created. Further, by this squelch table and the modified node ID, a modified squelch table is created. Further, in this case, if there is no failure with the node nearest the transmission node, the communication can be continued at least with the node nearest the transmission node, therefore no squelch operation is carried out between the two.

Figure 25:
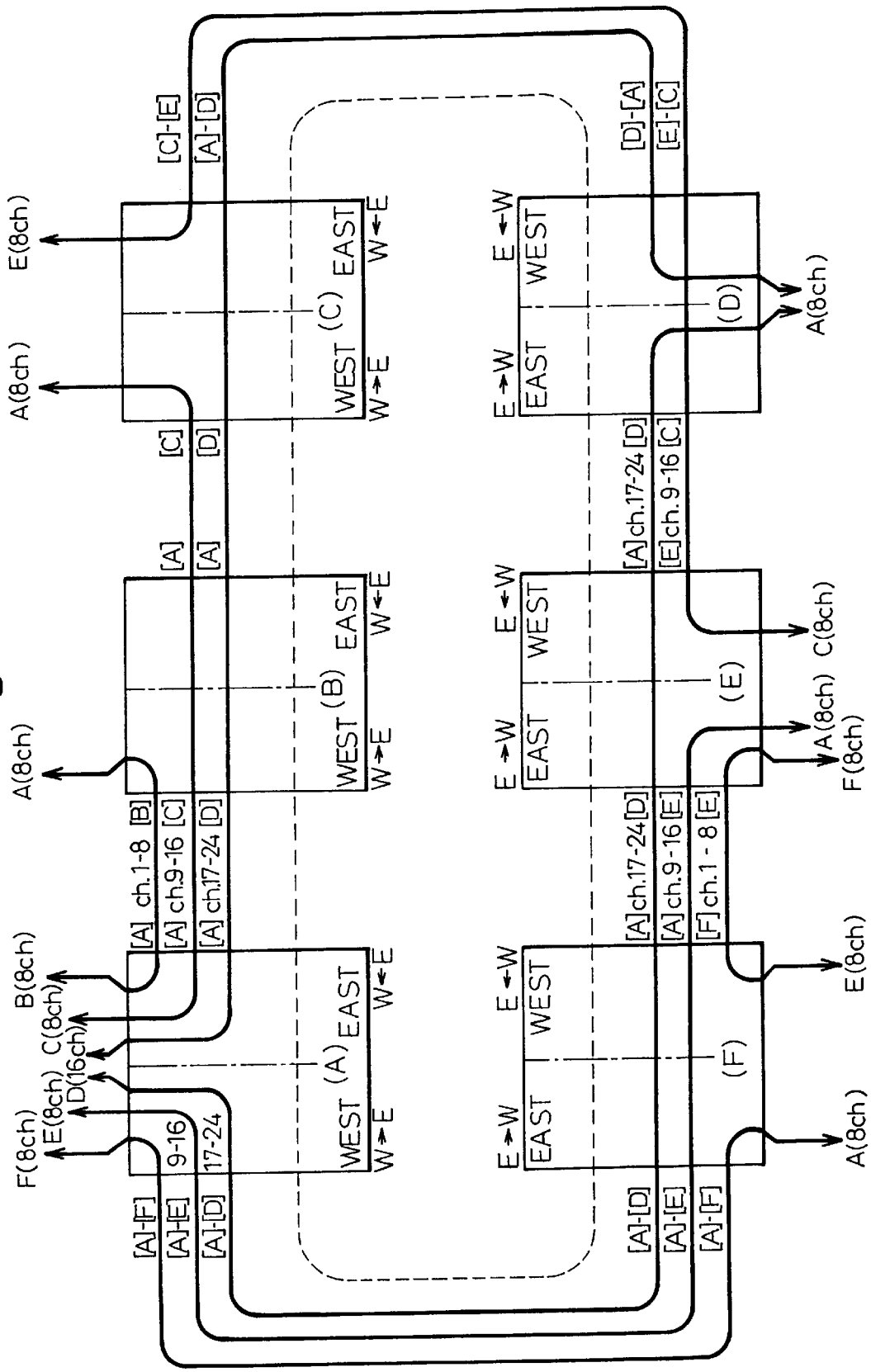
FIG. 25 is an explanatory view of path setting states among nodes.

FIG. 25 is an explanatory view of the path setting states among the nodes. It shows a case where paths are set up between the nodes (A) and (B) via the channels ch.1 to ch.8 at the East side of the node (A), between the nodes (A) and (C) via the channels ch.9 to ch.16, between the nodes (A) and (D) via the channels ch.17 to ch.24, between the nodes (A) and (F) via the channels ch.1 to ch.8 at the West side of the node (A), between the nodes (A) and (E) via the channels ch.9 to ch.16, between the nodes (A) and (D) via the channels ch.17 to ch.24, between the nodes (C) and (E) via the channels ch.9 to ch.16 at the East side of the node (C), and between the nodes (E) and (F) via the channels ch.1 to ch.8 at the East side of the node (E), respectively.

FIG. 26 and FIG. 27 are explanatory views of the squelch table. For example, the ring topology [A] in the node (A) shown in FIG. 26 indicates the order of connection in the clockwise direction starting from the node (A) and indicates the fact that five nodes (B, C, D, E and F) are connected with itself, as "5" on the right side of [A]. Further, the squelch table [A] indicates that, for the channel ch.1, there are the transmission node B and the reception node A at the East side in the E→W direction (DIREC), there are the transmission node A and the reception node F at the West side, there are the transmission node A and the reception node B at the East side in the E←W direction, and there are the transmission node F and the reception node A at the West side. For the channel ch.9, it indicates that there are the transmission node C and the reception node A at the East side in the E→W direction, there are the transmission node A and the reception node E at the West side, there are the transmission node A and the reception node C at the East side in the E←W direction, and there are the transmission node E and the reception node A at the West side. Further, for the channel ch.17, the transmission node and the reception node become A and D in both of the E→W direction and the E←W direction.

Figure 28:
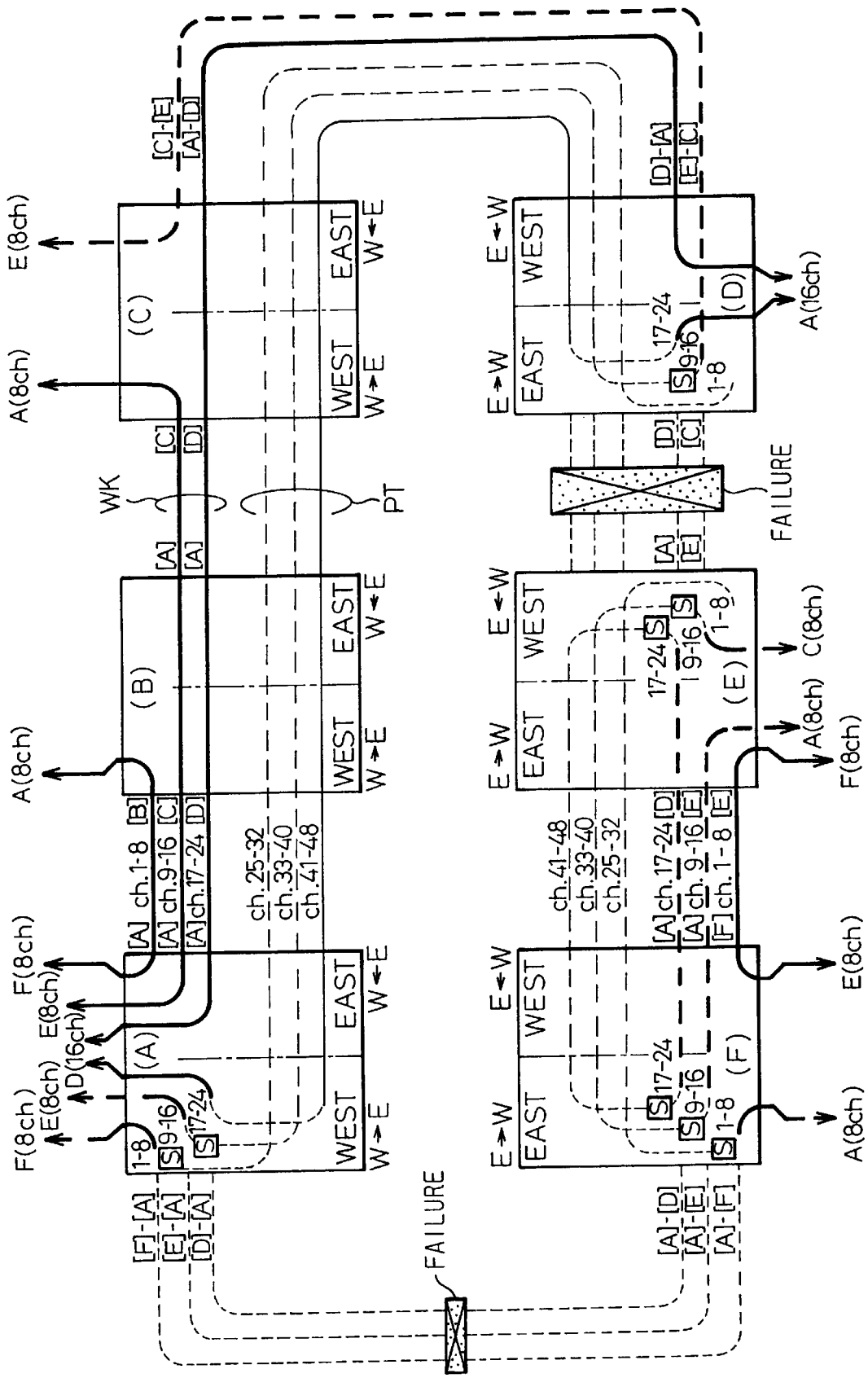
FIG. 28 is an explanatory view of ring transmission lines at the time of occurrence of a plurality of failures.

Further, for example, in the squelch table [D] of the node (E) shown in FIG. 27, the transmission node and the reception node are set to E and C for the E→W direction and the E←W direction of the channel ch.9, respectively, and similarly the transmission node and the reception node are set to A and D for the E→W direction and the E←W direction of the channel ch.17, respectively FIG. 28 is an explanatory view of the ring transmission lines when a plurality of failures occur. It indicates a case where the failures occur between the nodes (A) and (F) and between the nodes (E) and (D). It indicates a state where the ring transmission lines are divided to the first sub-ring composed by the nodes (A) to (D) by the lqopback in the nodes (A) and (D) and the second sub-ring composed by the nodes (E) and (F) by the loopback in the nodes (E) and (F). Further, S indicates a point for performing the squelch operation.

Figure 29:
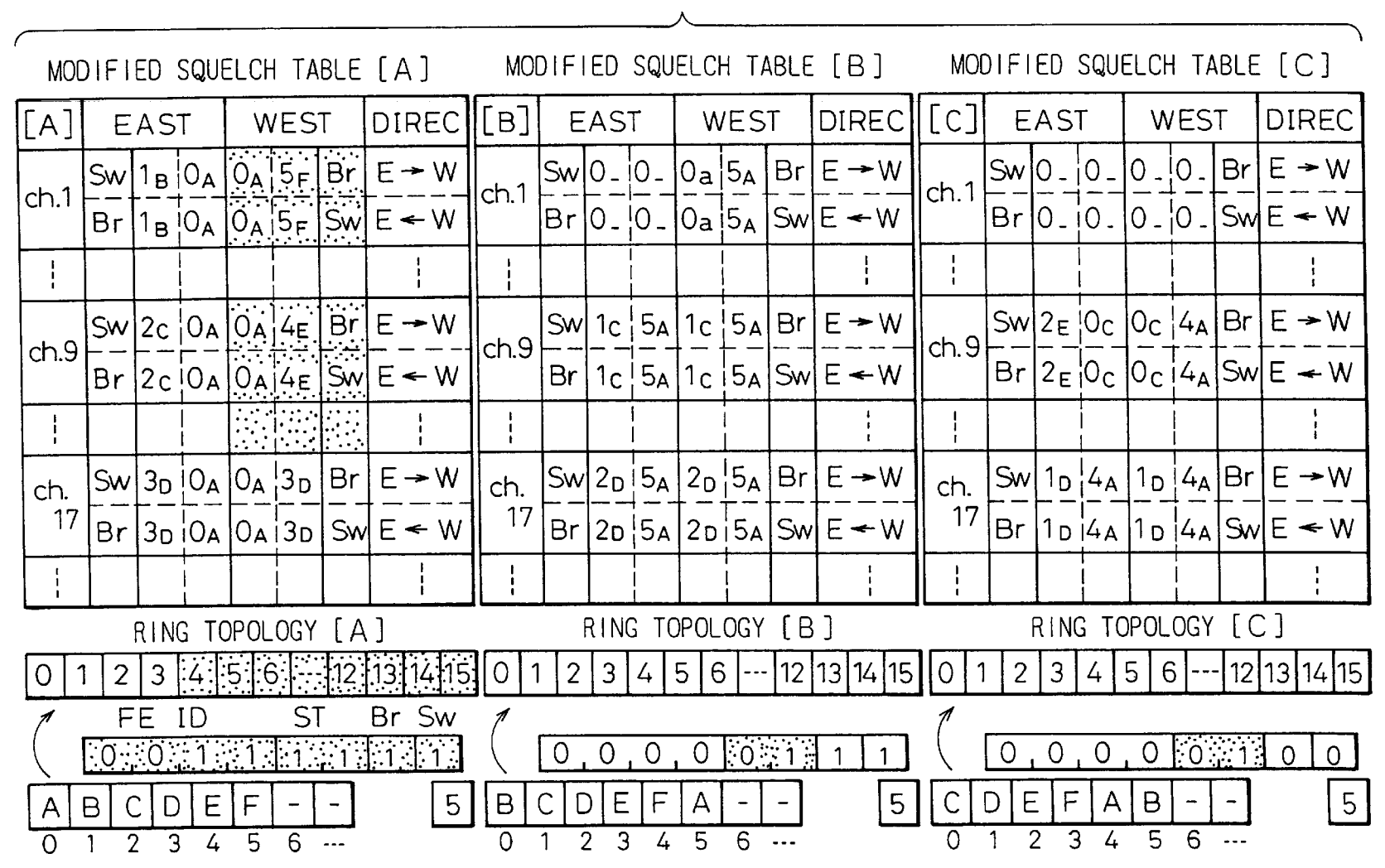
Figure 30:
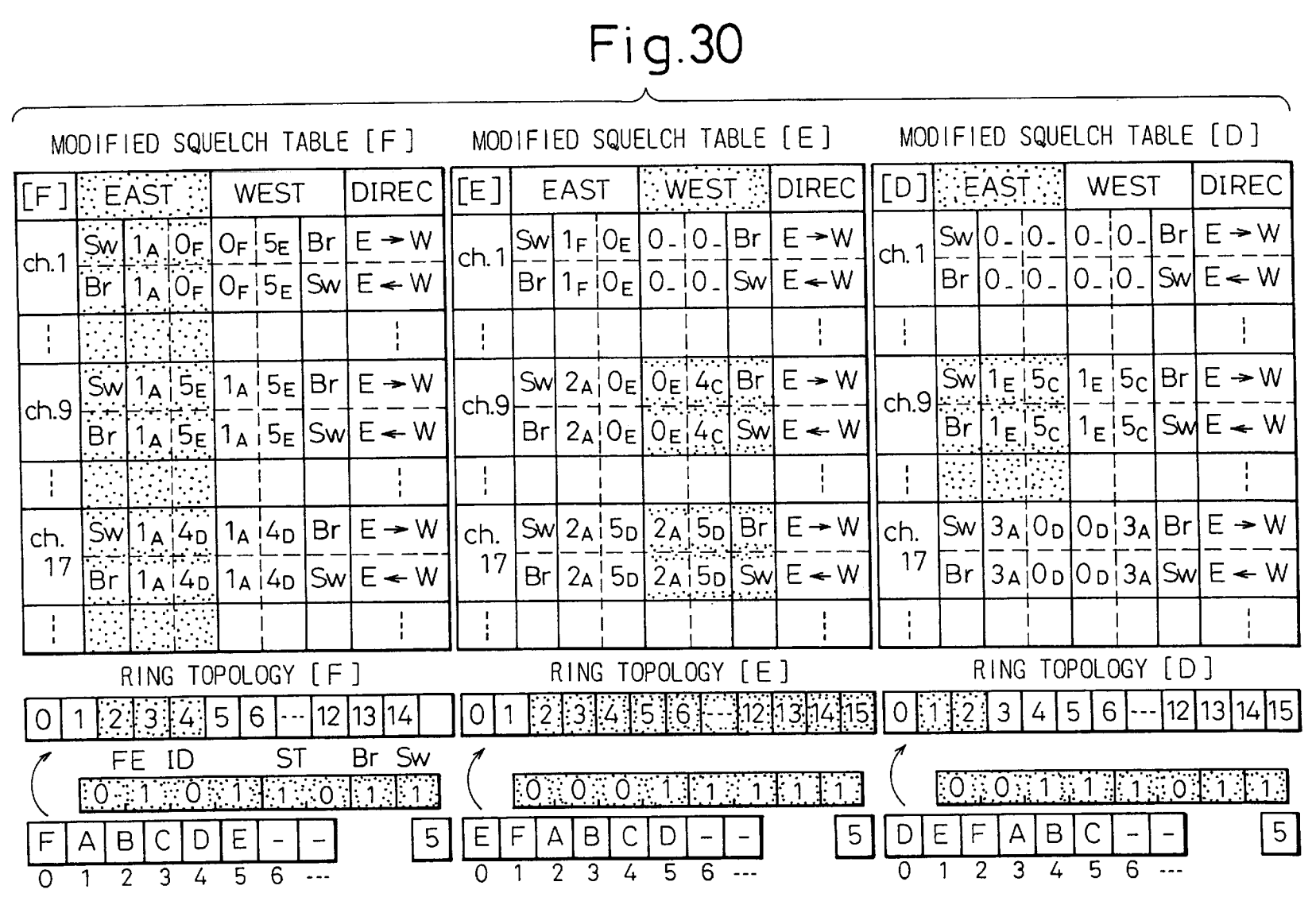

FIG. 29 and FIG. 30 are explanatory views of modified squelch tables and indicate the modified squelch tables [A] to [F] created by using the modified node IDs based on the squelch tables [A] to [F] shown in FIG. 26 and FIG. 27 mentioned before. For example, the "$_B$" of the "$1_B$" in the modified squelch table [A] is attached so as to facilitate the understanding that the modified node ID =1 corresponds to the node B of the squelch table [A] of FIG. 26. The same is true also for the other suffixes.

Further, the ring topologies [A] to [F] represent the ring topologies indicated by A to F by using the modified node IDs while defining each home node as 0. Further, it indicates also the control information comprised of the far end node ID (FEID) from the switch handling unit HS to the main signal handling unit HM at the time of occurrence of the failure shown in FIG. 28, the node status ST, the bridge Br, and the switch Sw.

For example, in the node (A), due to the failure at the West side, a loopback using the protection line channels ch.25 to ch.48 is created at the West side. At this time, the node (A) discriminates that the transmission node of the automatic protection switch (APS) code changes from the node (F) to the node (D). This node (D) has the modified node ID=3. The control information comprised of the FEID (=4), ST (=West side switch), Br, and Sw respectively having the values of "0011", "10", "1", and "1" is transferred from the switch handling unit HS to the main signal handling unit HM.

Therefore, the main signal handling unit HM refers to the modified squelch table [A] to search for whether or not a node having a modified node ID of 4 or more is included. In this case, the channels ch.1 and ch.9 include nodes having modified node IDs of 4 or more, therefore it is decided that the squelch operation is necessary for these channels ch.1 and ch.9. Further, the channel ch.17 becomes the loopback channel using the protection line channels ch.41 to ch.48, therefore it is seen that the communication between the nodes (A) and (D) is continued by this channel ch.17 and the squelch operation is unnecessary.

Further, in the node (E), due to the failure at the East side, a loopback is created on the West side. At this time, the transmission node of the automatic protection switch (APS) code changes from the node (A) to the node (F), therefore the node (E) can discriminate that signals are not received at the nodes having modified node IDs of 2 or more. The control information comprised by the FEID (=1), ST (West side switch), Br, and Sw respectively having the values of "0001", "11", "1", and "1" is transferred from the switch handling unit HS to the main signal handling unit HM in this case.

Therefore, the main signal handling unit HM refers to the modified squelch table [E] and searches for nodes having modified node IDs of 2 or more. By this, it is found that nodes having modified node IDs of 2 or more are included in the channels ch.9 and ch.17, therefore it is decided that the squelch operation is necessary.

The other nodes can perform operations similar to that explained above to refer to the modified squelch tables and carry out a squelch decision. Further, where the ring transmission lines are divided into the second sub-ring to which for example the node (E) belongs and the first sub-ring to which the node (D) belongs due to the occurrence of a plurality of failures, for example the node (E) can refer to the modified squelch table [E] and decide that the squelch operation is necessary when the transmission node or the reception node exists in the sub-ring to which the node (D) belongs. Further, the squelch decision can be carried out by the comparison of magnitude of the modified node ID, therefore the squelch decision circuit can be constituted by a relatively simple logical circuit shown in FIG. 11 to FIG. 14. Further, the squelch decision can be executed at a high speed by hardware.

As explained above, the present invention has the advantage that each node constituting the ring transmission system includes a modified squelch table and a squelch decision unit and, at an occurrence of a failure, the squelch decision can be carried out by the comparison of the magnitude of the modified node ID numbers. Therefore the squelch decision units can be realized by relatively simple comparators and, at the same time, since these are hardware, a high speed decision becomes possible. Further, by transmitting the ring topology frame and inserting the ID number of each node to build the ring topology, creating a squelch table relating to the path setting among the nodes based on that topology, and creating a modified squelch table comprised of the node ID numbers translated to modified node ID numbers using the home node as the reference value, the squelch decision mentioned before can be carried out by a comparison of the magnitude of the modified node ID numbers. Further, by performing a squelch operation with respect to the drop channels of the protection lines or the unused lines, there is the advantage that the occurrence of erroneous connection can be reliably prevented.

What is claimed is:

1. A squelch method adopted to a bidirectional line switched ring type ring transmission system comprised of a plurality of nodes connected by the ring transmission lines, where the ring transmission lines include working lines and protection lines containing therein protection line channels comprising the steps:

setting a node status indicating either of an idle state in a normal mode and both a pass through state and both switching states of an East side and a West side at the occurrence of a failure;

performing a squelch decision with respect to the protection line channels in accordance with the setting of the node status; and performing a squelch operation in accordance with the squelch decision before assigning time slots for all drop side protection line channels.

2. A squelch method adopted to a ring transmission system as set forth in claim 1, further comprising a step of:

performing a squelch operation before assigning time slots for said all drop side protection line channels which are receiving channels of signals from one of said nodes, when the node status indicates the pass through state.

3. A squelch method adopted to a bidirectional line switched ring type ring transmission system comprising a plurality of nodes connected by ring transmission lines, said squelch method comprising the steps of:

deciding, if a failure occurs, whether or not a squelch operation is necessary and then compulsorily carrying out the squelch operation for unused line channels, including idle line channels and unassigned line channels; and notifying from each node to a controller unit, results of the squelch decisions from among results of the squelch decisions at a main signal handling unit, except the result of the compulsory squelch operation on the unused line channels.

4. A squelch method adopted to a ring transmission system as set forth in claim 3, wherein each node stores its own ID number or its own modified node ID number for the unused line channels in a squelch table or a modified squelch table.

* * * * *